US011106979B2

(12) United States Patent
Ramanath et al.

(10) Patent No.: US 11,106,979 B2
(45) Date of Patent: Aug. 31, 2021

(54) UNSUPERVISED LEARNING OF ENTITY REPRESENTATIONS USING GRAPHS

(71) Applicant: Microsoft Technology Licensing, LLC, Redmond, WA (US)

(72) Inventors: Rohan Ramanath, Saratoga, CA (US); Gungor Polatkan, San Jose, CA (US); Qi Guo, Sunnyvale, CA (US); Cagri Ozcaglar, Sunnyvale, CA (US); Krishnaram Kenthapadi, Sunnyvale, CA (US); Sahin Cem Geyik, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 16/021,617

(22) Filed: Jun. 28, 2018

(65) Prior Publication Data
US 2020/0005153 A1    Jan. 2, 2020

(51) Int. Cl.
*G06N 3/08*     (2006.01)
*G06N 3/04*     (2006.01)
*G06F 16/248*   (2019.01)
*G06F 16/901*   (2019.01)

(52) U.S. Cl.
CPC .......... *G06N 3/088* (2013.01); *G06F 16/248* (2019.01); *G06F 16/9024* (2019.01); *G06N 3/04* (2013.01)

(58) Field of Classification Search
CPC .... G06F 17/30; G06F 16/248; G06F 16/9024; G06K 9/72; G06N 3/088; G06N 3/04
USPC ........................................................ 707/722
See application file for complete search history.

(56) References Cited

U.S. PATENT DOCUMENTS

| 7,117,207 | B1 * | 10/2006 | Kerschberg ........... G06F 16/337 |
| 8,180,804 | B1 * | 5/2012 | Narayanan ........ G06F 16/24575 707/798 |
| 8,583,659 | B1 * | 11/2013 | Alexandrescu ... G06F 16/24578 707/748 |
| 9,569,735 | B1 | 2/2017 | Zhu et al. |

(Continued)

OTHER PUBLICATIONS

Non-Patent Literature: "What's in a Name? An Unsupervised Approach to Link Users across Communities;" Jing Liu, Fan Zhang, Xinying Song, Young-In Song, Chin-Yew Lin, Hsiao-Wuen Hon; Feb. 4-8, 2013, Rome, Italy; ACM.*

(Continued)

*Primary Examiner* — Giovanna B Colan
(74) *Attorney, Agent, or Firm* — Schwegman Lundberg & Woessner, P.A.

(57) ABSTRACT

Techniques for implementing a learning semantic representations of sparse entities using unsupervised embeddings are disclosed herein. In some embodiments, a computer system accesses corresponding profile data of users indicating at least one entity of a first facet type associated with the user, and generating a graph data structure comprising nodes and edges based on the accessed profile data, with each node corresponding to a different entity indicated by the accessed profile data, and each edge directly connecting a different pair of nodes and indicating a number of users whose profile data indicates both entities of the pair of nodes. The computer system generating a corresponding embedding vector for the entities based on the graph data structure using an unsupervised machine learning algorithm.

16 Claims, 14 Drawing Sheets

(56) References Cited

U.S. PATENT DOCUMENTS

| | | | |
|---|---|---|---|
| 10,795,897 B2* | 10/2020 | Ramanath | G06N 3/084 |
| 2010/0049770 A1 | 2/2010 | Ismalon | |
| 2011/0016118 A1 | 1/2011 | Edala et al. | |
| 2012/0054040 A1 | 3/2012 | Bagherjeiran et al. | |
| 2014/0156360 A1* | 6/2014 | Shalita | G06Q 30/0255 |
| | | | 705/14.1 |
| 2014/0214814 A1* | 7/2014 | Sankar | G06Q 30/02 |
| | | | 707/723 |
| 2015/0081725 A1* | 3/2015 | Ogawa | H04L 29/08072 |
| | | | 707/754 |
| 2015/0120717 A1* | 4/2015 | Kim | G06F 16/335 |
| | | | 707/727 |
| 2015/0317344 A1* | 11/2015 | Birdwell | G06F 16/2264 |
| | | | 707/797 |
| 2017/0178031 A1 | 6/2017 | Zhu et al. | |
| 2017/0364637 A1* | 12/2017 | Kshepakaran | G16H 10/60 |
| 2018/0032568 A1* | 2/2018 | Pal | G06F 16/955 |
| 2018/0341839 A1* | 11/2018 | Malak | G06K 9/4628 |
| 2018/0365212 A1* | 12/2018 | Banerjee | H04L 51/02 |
| 2019/0034793 A1* | 1/2019 | Kataria | G06N 3/04 |
| 2019/0114362 A1* | 4/2019 | Subbian | G06F 16/24578 |
| 2019/0188295 A1 | 6/2019 | Sirotkovic et al. | |
| 2019/0205481 A1* | 7/2019 | Gutnik | G06F 16/9024 |
| 2019/0258722 A1 | 8/2019 | Guo et al. | |
| 2019/0258739 A1 | 8/2019 | Guo et al. | |
| 2020/0004835 A1 | 1/2020 | Ramanath et al. | |
| 2020/0004886 A1 | 1/2020 | Ramanath et al. | |
| 2020/0005134 A1 | 1/2020 | Ramanath et al. | |
| 2020/0005149 A1 | 1/2020 | Ramanath et al. | |

OTHER PUBLICATIONS

"Convex Optimization", Retrieved from: https://en.wikipedia_org/w/index.php?title=Convex_optimization&oldid=839012227, Retrieved on: Apr. 30, 2018, 7 Pages.

"Non Final Office Action Issued in U.S. Appl. No. 16/021,667", dated Mar. 25, 2020, 9 pages.

Gao, et al., "DSSM", Retrieved From: https://www.microsoft.com/en-us/research/project/dssm/, Jan. 30, 2015, 2 Pages.

Lin, et al., "Exploring Context with Deep Structured Models for Semantic Segmentation", In repository of arXiv, arXiv:1603.03183, May 10, 2016, 14 Pages.

Weisstein, Eric W.., "L∧1-Norm", Retrieved from https://web.archive.org/web/20190620225124/http://mathworld.wolfram.com/L1-Norm.html, Jun. 20, 2019, 1 Page.

Weisstein, Eric W.., "L∧2-Norm", Retrieved from: https://web.archive.org/web/20180720072644/http://mathworld.wolfram.com/L2-Norm.html, Retrieved on: Jul. 20, 2018, 1 Page.

Weisstein, Eric W.., "L∧infty-Norm", Retrieved from: https://web.archive.org/web/20180511090031/http://mathworld.wolfram.com/L-Infinity-Norm.html, Retrieved on: May 11, 2018, 1 Page.

"Non-Final Office Action Issued in U.S. Appl. No. 16/021,639", dated Sep. 15, 2020, 14 Pages.

"Non Final Office Action Issued in U.S. Appl. No. 16/021,692", dated Apr. 1, 2021, 12 Pages.

Truyen, et al., "Probabilistic Models over Ordered Partitions with Application in Learning to Rank", In Repository of arXiv:1009.1690v2, Oct. 4, 2010, pp. 1-19.

"Non Final Office Action Issued in U.S. Appl. No. 16/021,654", dated Apr. 20, 2021, 25 Pages.

Dai, et al., "Semi-supervised sequence learning", arXiv preprint arXiv:1511.01432, 2015, 10 Pages.

Tang, et al., "LINE: Large-Scale Information Network Embedding", In repository of arXiv, arXiv:1503.03578, Mar. 12, 2015, 11 Pages.

* cited by examiner

FIG. 3

UNSUPERVISED LEARNING OF ENTITY REPRESENTATIONS USING GRAPHS

TECHNICAL FIELD

The present application relates generally to architectures for neural networks and, in one specific example, to methods and systems of implementing an architecture for neural networks used for search.

BACKGROUND

Current architectures used for processing search queries suffer increased latency in processing search queries that involve complex considerations in generating search results for the search query. In these architectures, the more complex the data of the search query and the data of the items being evaluated for inclusion as search results, the more it is computationally expensive to process the search query while still providing relevant search results. As a result, current search architectures suffer from a technical problem of sacrificing processing speed for search result relevance or vice-versa. Other technical problems arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 3 illustrates a graphic user interface (GUI) displaying a search results page, in accordance with an example embodiment.

DETAILED DESCRIPTION

Figure 1:
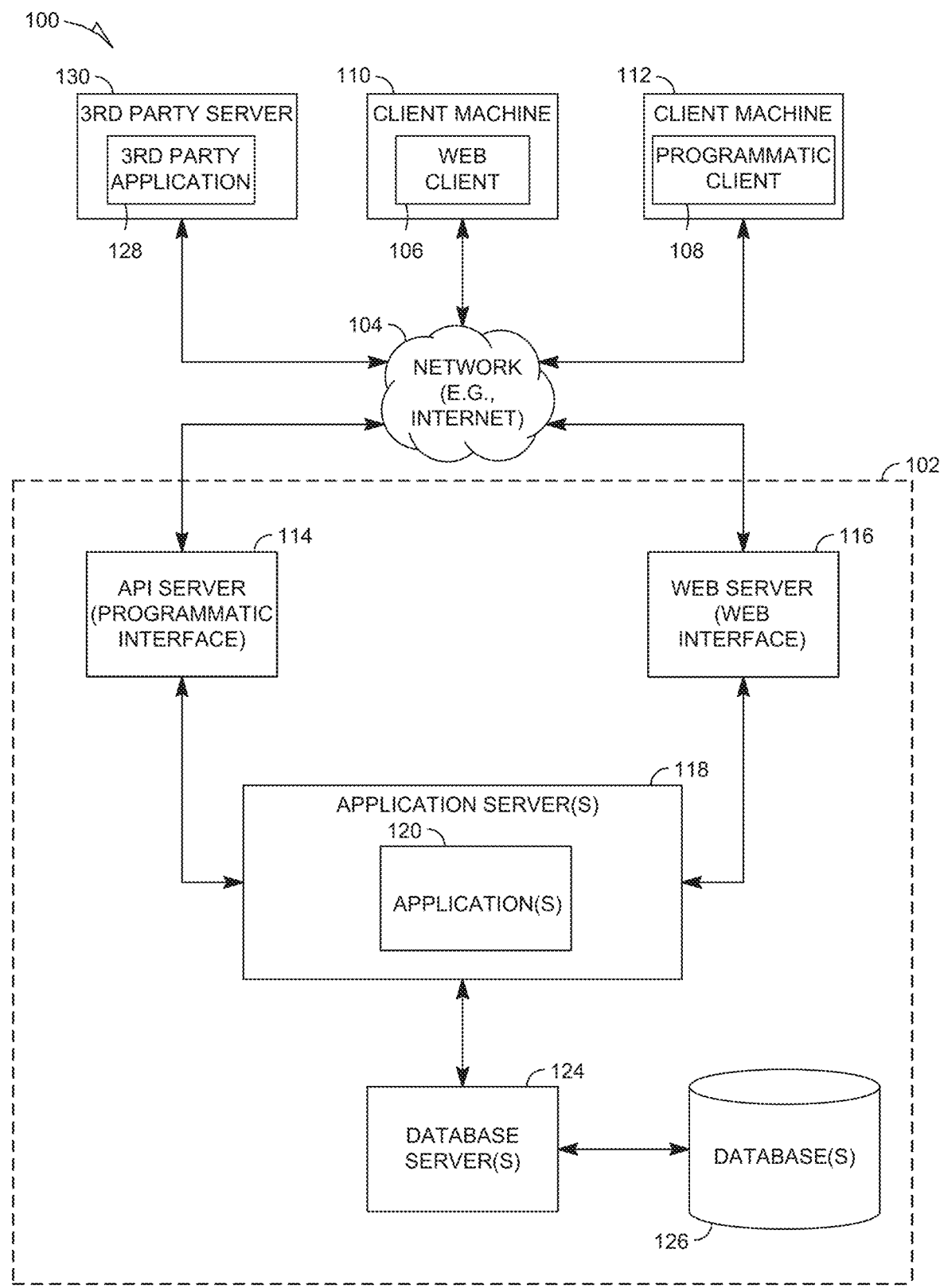
FIG. 1 is a block diagram illustrating a client-server system, in accordance with an example embodiment.

Example methods and systems of learning semantic representations of sparse entities using unsupervised embeddings via utilization of a graph are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to improve the ability of a search system to process search queries involving complex data, maximizing the relevance of the search results, while avoiding latency issues that hinder other search systems. Additionally, other technical effects will be apparent from this disclosure as well.

In some example embodiments, operations are performed by one or more computer systems (or other machines) having a memory and at least one hardware processor, with the operations comprising: for each one of a plurality of users of an online service, accessing, by a computer system having a memory and at least one hardware processor, corresponding profile data of the user stored on a database of the online service, the accessed profile data of each user indicating at least one entity of a first facet type associated with the user; generating, by the computer system, a graph data structure based on the accessed profile data, the generated graph data structure comprising a plurality of nodes and a plurality of edges, each one of the plurality of nodes corresponding to a different entity indicated by the accessed profile data, and each one of the plurality of edges directly, connecting a different pair of the plurality of nodes and indicating a number of the plurality of users whose profile data indicates both entities of the pair of nodes that are directly connected by the edge; generating, by the computer system, a corresponding embedding vector for each one of the entities indicated by the accessed profile data using an unsupervised machine learning algorithm; and performing, by the computer system, a function of the online service using the generated embedding vectors of the entities. In some example embodiments, the online service comprises a social networking service.

In some example embodiments, the performing the function comprises: receiving, from a client computing device, a search query indicating an entity of the first facet type; generating one or more search results for the search query using the generated embedding vectors of the entities, the one or more search results comprising at least one of the plurality of users; and causing the one or more search results to be displayed on the client computing device.

In some example embodiments, the first facet type comprises one of a job title, a company, a skill, a school, a degree, and an educational major.

In some example embodiments, the unsupervised machine learning algorithm is configured to optimize the corresponding embedding vector of each one of the entities to result in a level of similarity between the corresponding embedding vectors of two entities increasing as the number of the plurality of users whose profile data indicates the two entities increases. In some example embodiments, the unsupervised machine learning algorithm is further configured to optimize the corresponding embedding vector of each one of the entities to result in a level of similarity between the corresponding embedding vectors of two entities increasing as the number of neighbor nodes shared by the two entities increases.

In some example embodiments, the embedding vectors for the plurality of entities are generated using a neural network.

In some example embodiments, the accessed profile data of each user also indicates at least one other entity of a second facet type associated with the user, the second facet type being different than the first facet type, the method further comprising: generating, by the computer system, another graph data structure comprising a another plurality of nodes and another plurality of edges, each one of the other plurality of nodes corresponding to a different other entity indicated by the accessed profile data, and each one of the other plurality of edges directly connecting a different other pair of the other plurality of nodes and indicating a number of the plurality of users whose profile data indicates both other entities of the other pair of nodes that are directly connected by the other edge; and generating, by the computer system, a corresponding embedding vector for each one of the other entities using the unsupervised machine learning algorithm, wherein the function of the online service is performed using the generated embedding vectors of the other entities.

In some Example Embodiments, the operations comprise: Receiving, by a computer system having a memory and at least one hardware processor, training data comprising a plurality of query representations, a plurality of search result representations for each one of the plurality of query representations, and a plurality of user actions for each one of the plurality of query representations, each one of the plurality of query representations representing at least one entity included in a corresponding search query submitted by a querying user, the corresponding plurality of search result representations for each one of the plurality of query representations representing a plurality of candidate users displayed in response to the plurality of search queries based on profile data of the plurality of candidate users stored on a database of an online service, the plurality of user actions comprising actions by the querying user directed towards at least one candidate user of the plurality of search results for the corresponding search query; generating, by the computer system, a corresponding embedding vector for each one of the at least one entity using a supervised learning algorithm and the received training data; and performing, by the computer system, a function of the online service using the generated embedding vector for each one of the at least one entity.

In some example embodiments, the user actions comprise at least one of selecting to view additional information of the candidate users and sending messages to the candidate users.

In some example embodiments, the training data further comprises a corresponding reaction indication for each one of the plurality of user actions; each reaction indication indicating whether the candidate user to whom the corresponding user action was directed responded to the corresponding user action with at least one of one or more specified responses. In some example embodiments, the user actions comprise sending messages to the candidate users, and the one or more specified responses comprise at least one of accepting the message, viewing the message, and sending a reply message to the querying user.

In some example embodiments, the at least one entity comprises one of a job title, a company, a skill, a school, a degree, and an educational major.

In some example embodiments; the performing the function comprises: receiving, from a client computing device, a search query indicating an entity; generating one or more search results for the search query using the generated embedding vectors of the entities, the one or more search results comprising indications of at least one user of the online service; and causing the one or more search results to be displayed on the client computing device.

In some example embodiments, the generating the corresponding embedding vector for each one of the at least one entity comprises using a neural network. In some example embodiments, the supervised learning algorithm comprises a backpropagation algorithm.

In some example embodiments, the operations comprise: for each one of a plurality of reference users of an online service, accessing, by a computer system having a memory and at least one hardware processor, corresponding profile data of the reference user stored on a database of the online service, the accessed profile data of each reference user indicating at least one entity of a first facet type associated with the reference user; generating, by the computer system, a graph data structure based on the accessed profile data, the generated graph data structure comprising a plurality of nodes and a plurality of edges, each one of the plurality of nodes corresponding to a different entity indicated by the accessed profile data, and each one of the plurality of edges directly connecting a different pair of the plurality of nodes and indicating a number of the plurality of reference users whose profile data indicates both entities of the pair of nodes that are directly connected by the edge; generating, by the computer system, a corresponding initial embedding vector for each one of the entities indicated by the accessed profile data using an unsupervised machine learning algorithm; receiving, by the computer system, training data comprising a plurality of query representations, a plurality of search result representations for each one of the plurality of query representations; and a plurality of user actions for each one of the plurality of query representations, each one of the plurality of query representations comprising the corresponding initial embedding vector of at least one entity included in a corresponding search query submitted by a querying user, the corresponding plurality of search result representations for each one of the plurality of query representations representing a plurality of candidate users displayed in response to the plurality of search queries based on profile data of the plurality of candidate users stored on the database of the online service, the plurality of user actions comprising actions by the querying user directed towards at least one candidate user of the plurality of search results for the corresponding search query; generating, by the computer system, a corresponding final embedding vector for each one of the at least one entity using a supervised learning algorithm and the received training data; and performing, by the computer system, a function of the online service using the generated final embedding vector for each one of the at least one entity.

In some example embodiments, the performing the function comprises: receiving, from a client computing device, a search query indicating an entity; generating one or more search results for the search query using the generated final embedding vectors of the entities, the one or more search results comprising indications of at least one user of the online service; and causing the one or more search results to be displayed on the client computing device.

In some example embodiments, the at least one entity comprises one of a job title, a company, a skill, a school, a degree, and an educational major.

In some example embodiments, the unsupervised machine learning algorithm is configured to optimize the corresponding embedding vector of each one of the entities to result in a level of similarity between the corresponding embedding vectors of two entities increasing as the number of the plurality of users whose profile data indicates the two entities increases. In some example embodiments, the unsupervised machine learning algorithm is further configured to optimize the corresponding embedding vector of each one of the entities to result in a level of similarity between the corresponding embedding vectors of two entities increasing as the number of neighbor nodes shared by the two entities increases.

In some example embodiments, the initial embedding vectors for the plurality of entities are generated using a neural network.

In some example embodiments, the user actions comprise at least one of selecting to view additional information of the candidate users and sending messages to the candidate users.

In some example embodiments, the training data further comprises a corresponding reaction indication for each one of the plurality of user actions, each reaction indication indicating whether the candidate user to whom the corresponding user action was directed responded to the corresponding user action with at least one of one or more specified responses. In some example embodiments, the user actions comprise sending messages to the candidate users, and the one or more specified responses comprise at least one of accepting the message, viewing the message, and sending a reply message to the querying user.

In some example embodiments, the generating the corresponding embedding vector for each one of the at least one entity comprises using a neural network. In some example embodiments, the supervised learning algorithm comprises a backpropagation algorithm.

In some example embodiments, the operations comprise: for each one of a plurality of user profiles stored on a database of an online service, retrieving, by a first neural network, profile data of the one of the plurality of user profiles from the database of the online service; for each one of the plurality of user profiles, generating, by the first neural network, a profile vector representation based on the retrieved profile data of the one of the plurality of user profiles; storing the profile vector representations of the plurality of user profiles in the database of the online service; receiving, by a computer system having a memory and at least one hardware processor, a query from a computing device of a querying user subsequent to the storing of the profile vector representations, the query comprising query data, the query data comprising at least one of query text or facet selection data; generating, by a second neural network distinct from the first neural network, a query vector representation for the query based on the query data of the query in response to the receiving of the query; retrieving, by the computer system, the stored profile vector representations of the plurality of user profiles from the database of the online service based on the receiving of the query; for each one of the plurality of user profiles, generating, by a third neural network distinct from the first neural network and the second neural network, a corresponding score for a pairing of the one of the plurality of user profiles and the query based on a determined level of similarity between the profile vector representation of the one of the plurality of user profiles and the query vector representation; and causing, by the computer system, an indication of at least a portion of the plurality of user profiles to be displayed on the computing device as search results for the query based on the generated scores of the plurality of user profiles.

In some example embodiments, the first neural network, the second neural network, and the third neural network are implemented on separate physical computer systems, each one of the separate physical computer systems having its own set of one or more hardware processors separate from the other separate physical computer systems.

In some example embodiments, the first neural network, the second neural network, and the third neural network each comprise a deep neural network.

In some example embodiments, the first neural network comprises a convolutional neural network.

In some example embodiments, the causing the indication of at least a portion of the plurality of user profiles to be displayed on the computing device as search results for the query comprises: ranking the plurality of user profiles based on their corresponding scores; and causing the at least a portion of the plurality of user profiles to be displayed on the computing device as search results for the query based on the ranking of the plurality of user profiles.

In some example embodiments, the profile data comprises at least one of a job title, a company, a skill, a school, a degree, and an educational major.

In some example embodiments, the third neural network determines the level of similarity between the profile vector representation of the one of the plurality of user profiles and the query vector representation based on a cosine similarity calculation.

In some example embodiments, the third neural network determines the level of similarity between the profile vector representation of the one of the plurality of user profiles and the query vector representation based on a dot product calculation.

In some example embodiments, the operations further comprise: selecting the plurality of user profiles in response to the receiving of the query based on a comparison of the query data and the corresponding profile data of the user profiles, wherein the retrieving of the stored profile vector representations of the plurality of user profiles from the database of the online service is further based on the selecting of the plurality of user profiles.

In some example embodiments, the operations comprise: receiving; by a computer system having a memory and at least one hardware processor, training data comprising a plurality of reference queries; a plurality of reference search results for each one of the plurality of reference queries, a plurality of user actions for each one of the plurality of reference queries, and a corresponding reaction indication for each one of the plurality of user actions, each one of the plurality of reference queries comprising reference query data and having been submitted by a reference querying user; the corresponding plurality of reference search results for each one of the plurality of reference queries comprising a plurality of reference candidate users displayed in response to the plurality of reference search queries based on profile data of the plurality of reference candidate users stored on a database of an online service, the plurality of user actions comprising actions by the reference querying user directed towards at least one reference candidate user of the plurality of reference search results for the corresponding reference search query; each reaction indication indicating whether the reference candidate user to whom the corresponding user action was directed responded to the corresponding user action with at least one of one or more specified responses;

training, by the computer system, a ranking model using the training data and a loss function, the ranking model comprising a deep learning model and configured to generate similarity scores based on a determined level of similarity between the profile data of the reference candidates users and the reference query data of the reference queries; receiving, by the computer system, a target query comprising target query data from a computing device of a target querying user; for each one of a plurality of target candidate users; generating, by the computer system, a corresponding score for a pairing of the one of the plurality of target candidate users and the target query based on a determined level of similarity between profile data of the one of the plurality of target candidate users and the target query data of the target query using the trained ranking model; and causing, by the computer system, an indication of at least a portion of the plurality of target candidate users to be displayed on the computing device as search results for the target query based on the generated scores of the plurality of target candidate users.

In some example embodiments, the training of the ranking model comprises using a pointwise learning model in applying the loss function. In some example embodiments, the loss function comprises a binomial log-likelihood loss function.

In some example embodiments, the training of the ranking model comprises using a pairwise learning model in applying the loss function. In some example embodiments, the loss function comprises a logistic loss function. In some example embodiments, the loss function comprises a hinge loss function.

In some example embodiments, the deep learning model comprises a neural network. In some example embodiments, the neural network comprises a multilayer perceptron.

The methods, operations, or embodiments disclosed herein may be implemented as one or more computer systems each having one or more modules (e.g., hardware modules or software modules). Such modules may be executed by one or more hardware processors of the computer system(s). The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
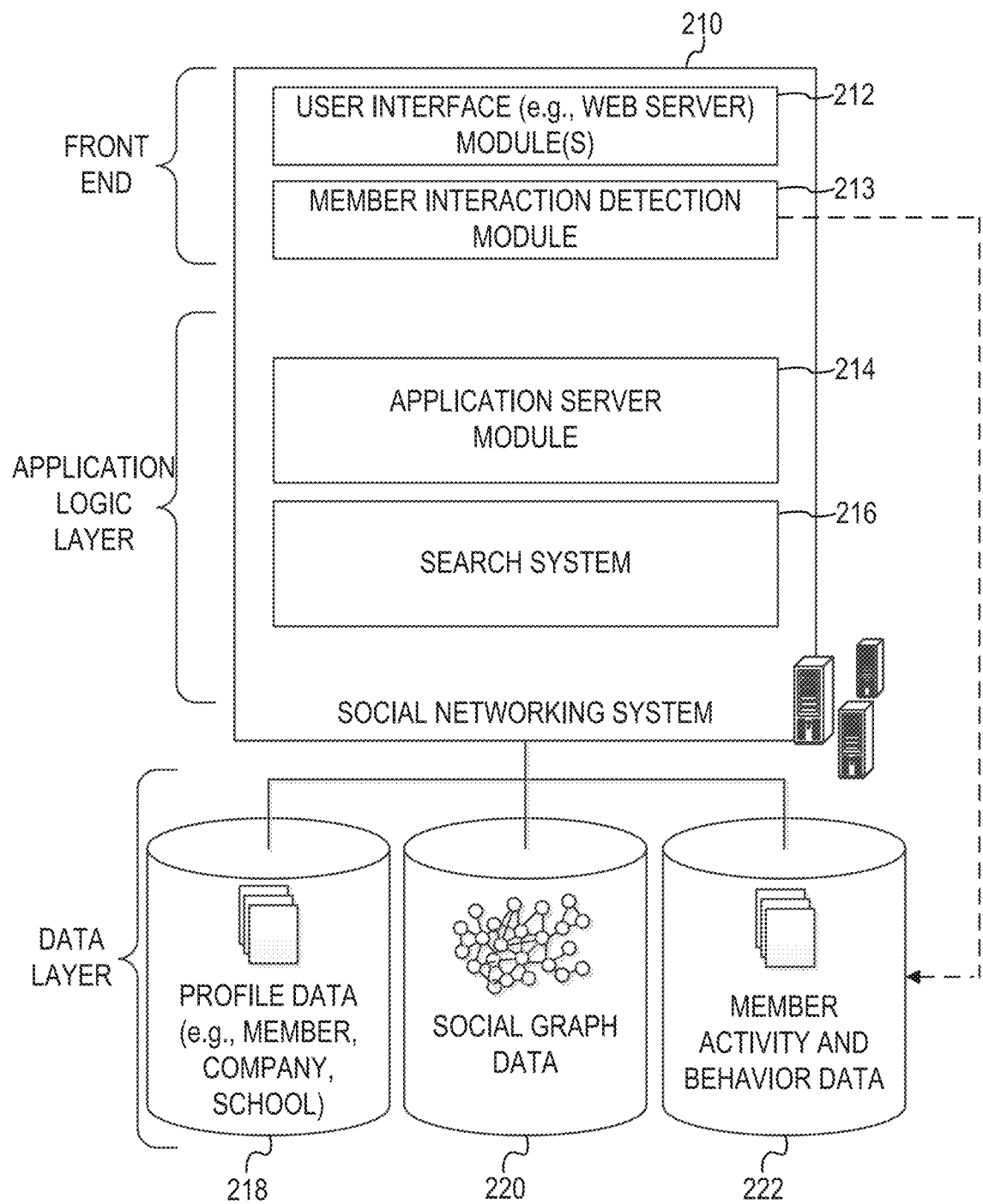
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a search system 216, for use in social networking system 210, consistent with some embodiments of the present disclosure. In some embodiments, the search system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the search system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family, members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the search system 216 is referred to herein as being used in the context of a social networking service, it is contemplated that it may also be employed in the context of any website or online services, including, but not limited to a general purpose online search engine. Additionally, although features of the present disclosure can be used or presented in the context of a web page, it is contemplated that any user interface view (e.g., a user interface on a mobile device or on desktop software) is within the scope of the present disclosure.

In some example embodiments, the search system 216 provides innovative tools to help users (e.g., recruiters, hiring managers, and corporations) search for and acquire candidates for positions at an organization. One challenge in this process is in translating the criteria of a hiring position into a search query. The user performing the search has to understand which skills are typically required for a position, which companies are likely to have such candidates, and which schools the candidates are most likely to graduate from, as well as other detailed information. Moreover, the knowledge and information varies over time. As a result, often multiple attempts are required to formulate a good query. To help the user performing the search, the search system 216 may provide advanced targeting criteria called facets (e.g., skills, schools, companies, titles, etc.). The query can be entered by the user performing the search as free text, a facet selection (e.g., selectable user interface elements corresponding to the facets) or the combination of the two. As a result, semantic interpretation and segmentation in such queries is important. For example, in the query "java" or "finance," the user performing the search could be searching for a candidate whose title contains the word or someone who knows a skill represented by the word. Relying on exact term or attribute match in faceted search for ranking is sub-optimal. The search system 216 provides a solution to the matching and ranking problem rather than just focusing on the query formulation.

In some example embodiments, the search system 216 uses latent semantic models to map a noisy high dimensional query to a low-dimensional representation to make the matching problem tractable. In some example embodiments, the search system 216 extends latent semantic models with a deep structure by projecting queries and talent attributes into a shared low-dimensional space where the relevance of a talent given a query is readily computed as the distance between them. In some example embodiments, the search system 216 employs an architecture in which a neural network scoring a query-item pair is split into three semantic pieces, such that each piece is scored on a separate system with its own characteristics. Additionally, in some example embodiments, the search system 216 computes semantic similarity (used in a downstream learning to rank model) using online low-dimensional vector representations in a scalable way (being able to score millions of items, such as members of a social networking service) without compromising system performance or site stability.

A crucial challenge in candidate search and recommendations is that the underlying query could be quite complex, and combines several structured fields (e.g., canonical titles, canonical skills, company names) and unstructured fields (e.g., free-text keywords). Depending on the application, the query could either consist of an explicitly entered query text and selected facets (talent search), or be implicit in the form of a job opening, or ideal candidate(s) for a job (talent recommendations). In some example embodiments, the search system 216 determines a ranked list of most relevant candidates among hundreds of millions of structured candidate profiles (e.g., member profiles of a social networking service).

In the context of candidate search, members of a social networking service can be divided into two categories: candidates (e.g., job seekers) and recruiters (e.g., job providers). Candidates look for suitable job opportunities, while recruiters seek candidates to fill job openings. Consider an example of a recruiter looking for a software engineer with machine learning background. Once the recruiter types keywords "software engineer" and "machine learning" as a free text query, the search engine of the search system 216 may first standardize them into the title "software engineer" and the skill "machine learning". Then, the search system 216 may match these standardized entities with standardized user profiles, and present the most relevant candidate results.

Figure 3:
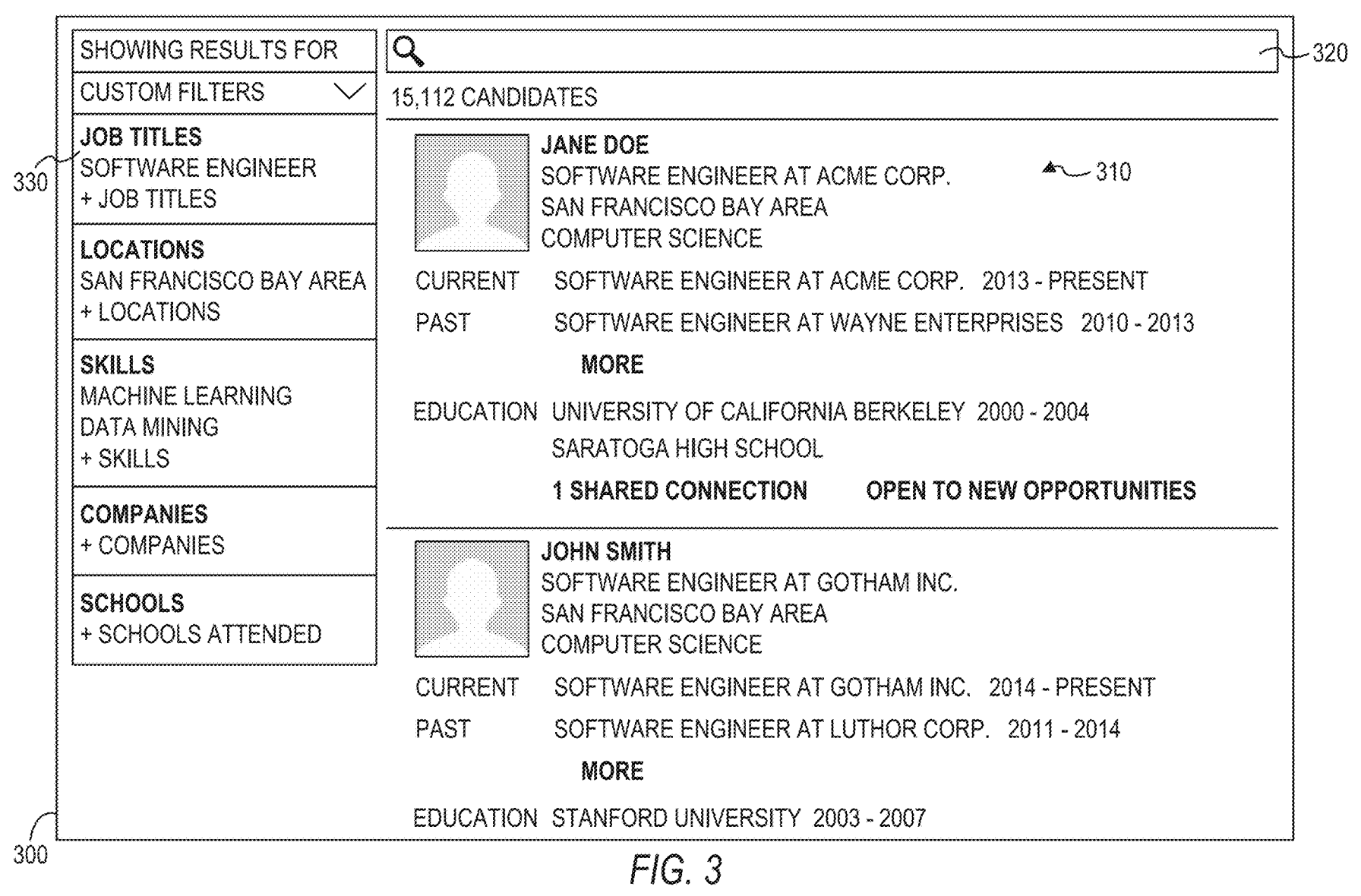

In some example embodiments, the search system 216 is configured to select candidates based at least in part on a search query submitted by a user and to cause the selected candidates to be displayed to the user on a search results page. FIG. 3 illustrates a graphic user interface (GUI) 300 displaying a search results page, in accordance with an example embodiment. In GUI 300, the user (e.g., a recruiter) may submit one or more terms of a search query using one or more user interface elements. For example, the user may submit the term(s) by either entering text into a search field 320 or by using a custom search filters panel 330 via which the user may select and enter the terms based on the corresponding category of the terms (e.g., job titles, locations, skills, companies, schools). These categories are referred to as facets. In response to the search query submitted by the user, the search system 216 may cause selected candidates 310 (e.g., job candidates) to be displayed on the search results page.

In some example embodiments, the user can select one or more of the candidates 310 that are displayed and submit an instruction that the search system 216 perform a user action directed towards the candidate(s) selected by the user. For each candidate 310, the recruiter can perform one or more of the following actions: viewing a profile of the candidate 310, bookmarking a profile of the candidate 310 for detailed evaluation later, saving a profile of the candidate 310 to their current hiring project (e.g., as a potential fit), and, sending a message to the candidate 310. For example, the user action may comprise sending a message to the candidate(s) 310 via the social networking service. In some example embodiments, the social networking service allows the user to send certain types of messages to candidates 310 to whom the user is not connected on the social networking service. These messages may be used by the user to contact anyone outside of the user's network (e.g., anyone the user is not connected to). One example of such messages is LinkedIn's InMails. However, other types of messages are also within the scope of the present disclosure. The messages may include information regarding an open position for which the user is recruiting. Candidates 310 who receive the messages may accept the messages and read or view them via the social networking service, send replies to the messages via the social networking service, decline or reject the messages via the social networking service, ignore the messages via the social networking service, or simply take no action regarding the messages.

Unlike traditional search and recommendation systems, which solely, focus on estimating how relevant an item is for a given query, the candidate search domain requires or otherwise involves mutual interest between the recruiter and the candidate in the context of the job opportunity. In some example embodiments, the search system 216 focuses on a requirement that a candidate should be relevant to the recruiter's query, and at the same time that the candidate contacted by the recruiter also shows interest in the job opportunity. Therefore, in some example embodiments, the search system 216 defines a new action event (e.g., "inMail Accept") that occurs when a candidate accepts and replies to message from a recruiter with a positive response. In some example embodiments, the key metric in the search system 216 is based on these accept and reply events and the search system 216 used the fraction of top k ranked candidate that received and accepted a message (e.g., precision@k) as the main evaluation measure.

In some example embodiments, the search system 216 functions as follows. In the first step, the search system 216 retrieves a candidate set of a few thousand members from over hundreds of millions of members of a social networking service, utilizing hard filters specified in a search query that triggered the search. In particular, a query request is created based on the standardized fields extracted from the free form text in the query, as well as, the selected facets (e.g., skill, title, industry). This query request is then issued to a distributed search service tier, which is built on top of a search platform. A list of candidates is generated based on the matching features (e.g., title or skill match). In the second step, a search ranker of the search system 216 scores the resulting candidates using a ranking model, and returns the top ranked candidate results.

Given a search query consisting of search criteria (e.g., title, skills, location) provided by the recruiter or the hiring manager, the goal of candidate search ranking is to determine a set of candidates strictly satisfying the specified search criteria (hard constraints), and to rank the candidates according to their utility for the recruiter, where the utility is the likelihood that the candidate would be a good fit for the position, and would be willing to accept a request (e.g., an InMail message) from the recruiter.

The search system 216 may use a Gradient Boosted Decision Tree (GBDT) model as the ranking model due to its advantages over linear models. However, while GBDT models provides quite a strong performance, they pose the following challenges. First, it is technically challenging and involved to augment a tree ensemble model with other trainable components, such as embeddings for discrete features. Such practices typically require joint training of the model with the component/feature, while the tree ensemble model assumes that the features themselves need not be trained. Second, tree models do not work well with sparse ID features, like skill entity IDs, company entity IDs, and others that may be useful for candidate search ranking (e.g., as a spare feature is non-zero for a very few examples in general, it has a small likelihood to be chosen by the tree generation at each boosting step, especially since the learned trees are shallow in general). Third, tree models lack model engineering flexibility. Using novel loss functions and augmenting an objective function with other terms are not easily achievable with GBDT models, while being relatively more achievable for deep learning models based on differentiable programming. A neural network model with a final (generalized) linear layer also makes it easier to adopt transfer learning and online learning.

In some example embodiments, in order to overcome the technical problems discussed above, the search system 216 uses specific neural network based models that enable vast flexibility in the design and modification of the model. The present disclosure provides solutions involving the application of deep and representation learning techniques for candidate search ranking, including but not limited to, learning semantic representations of sparse entities using unsupervised embeddings via the utilization of a graph data structure (e.g., an economic graph), generating supervised embedding representations using deep semantic structured models for search, combining supervised and unsupervised approaches to generate embedding representations of entities for search, generating search results for search queries using deep semantic features, and applying learning to rank with deep models for search.

A significant challenge for candidate search ranking is the sheer number of available entities that a recruiter can include as part of their search, and how to utilize them for candidate selection as well as ranking. For example, the recruiter can choose from tens of thousands of standardized skills. Since different entities could be related to each other (to a varying degree), using syntactic features (e.g., fraction of query skills possessed by a candidate) has its limitations. Instead, it is more desirable to utilize semantic representations of entities, for example, in the form of low dimensional embeddings. Such representations allow for the sparse and numerous entities to be better incorporated as part of a machine learning model. Therefore, in some example embodiments, the search system 216 employs the application of representational learning for entities in the candidate search domain, and, in some example embodiments, leverages a graph data structure to learn such representations using an unsupervised approach.

Most features used in candidate search and recommendation models are categorical in nature, representing entities such as skill, title, school, company, and other attributes of a member's profile. In fact, to achieve personalization, even the member herself could be represented as a categorical feature via her social networking service member ID. Such categorical features often suffer from sparsity issues because of the large search space, and learning a dense representation to represent these entities has the potential to improve model performance. While commonly used algorithms such as word2vec work well on text data when there is information encoded in the sequence of entities, they cannot be directly applied to all use cases, such as some of the use cases disclosed herein. Instead, in some example embodiments, the search system 216 uses a graph data structure, generated based on data from a social networking service, to learn the dense entity representations.

In some example embodiments, the graph data structure comprises an economic graph, which may comprise a digital representation or mapping of the global economy, including a profile for members of the global workforce, enabling them to represent their professional identity and subsequently find and realize their most valuable opportunities. The economic graph may also include profile for companies, such as a profile for every company in the world. The economic graph may digitally represent every economic opportunity offered by those companies, full-time, temporary, and volunteer, and every skill required to obtain these opportunities. The economic graph may include a digital presence for every higher education organization in the world that can help users of the online service obtain these skills. The economic graph may also comprise a digital representation of the relationships between these entities. Through mapping every user of the online service, company, job, and school, the online service is able to spot trends like talent migration, hiring rates, and in-demand skills by region, and provide the most complete and accurate data representation of real world relationships and associations for use in performing functions of the online service.

In some example embodiments, in order to obtain a representation for the entities using the graph data structure, the search system 216 uses a variety of graph embedding algorithms. In some example embodiments, the search system 216 employs a Large-Scale Information Network Embeddings (LINE) approach. One LINE approach comprises constructing the graph of a social networking service by defining the members of the social networking service as vertices, and use some form of interaction (e.g., clicks, connections, or social actions) between members to compute the weight of the edge between any two members. However, for candidate search, this would create a large sparse graph resulting in intractable training and a noisy model. Instead, in some example embodiments, the search system 216 defines a weighted graph, $G=(V, E, w \ldots)$, over the entities whose representations need to be learned (e.g., skill, title, company), and use the number of members sharing the same entity on their profile to induce an edge weight $(w \ldots)$ between the vertices. As a result, the search system 216 reduces the size of the problem by a few orders of magnitude by constructing a smaller and denser graph.

Figure 4:
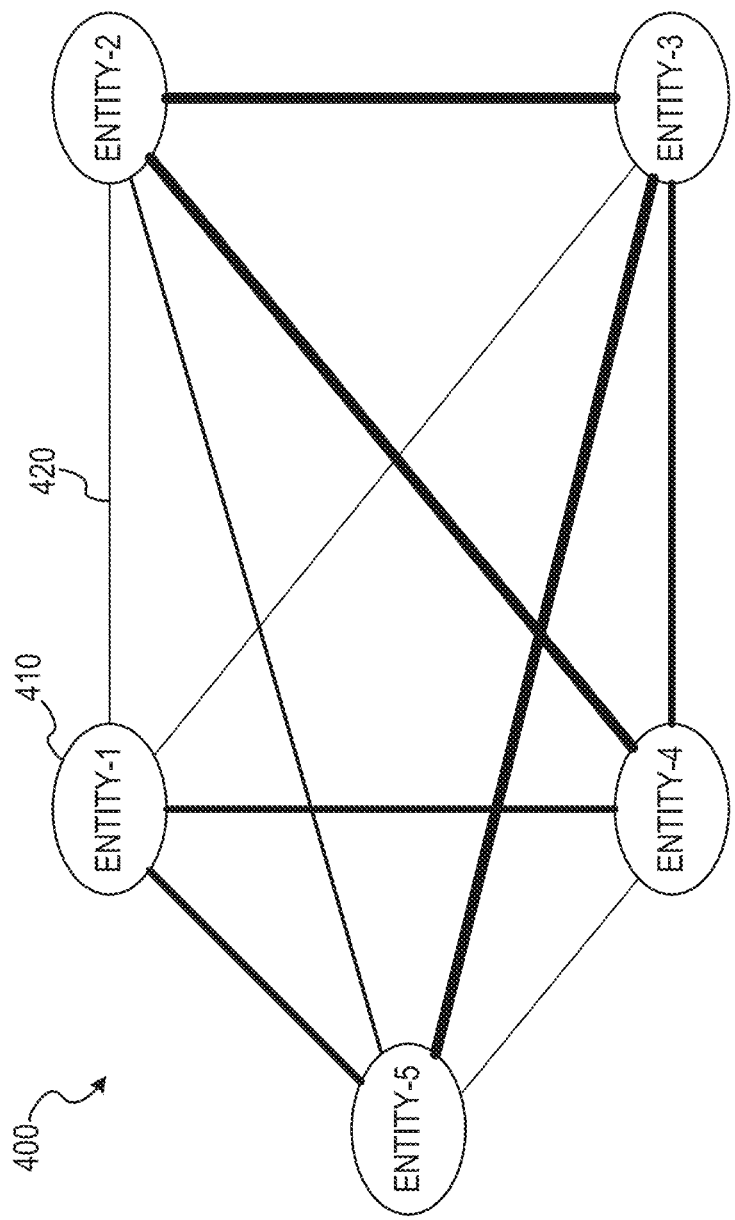
FIG. 4 illustrates a graph data structure, in accordance with an example embodiment.

FIG. 4 illustrates a graph data structure 400, in accordance with an example embodiment. The graph data structure 400 comprises an illustrative sub-network of the graph used to construct entity embeddings, such as embeddings for companies. In some example embodiments, each vertex or node 410 in the graph data structure 400 represents an entity, such as a company, and the edge weight, (denoted by the edge thickness) represents the number of members of the social networking service that share the entity, such as the number of members that have worked at both companies. Similar graph data structures can be constructed for other entity types, such as skills and schools, as well. In the example where the entities in the graph data structure 400 are companies, the search system 216 may embed each company (e.g., each node 410 in the graph data structure 400) into a fixed dimensional latent space. In some example embodiments, the search system 216 is configured to learn first order and second order embeddings from the graph data structure 400.

In some example embodiments, in learning the first order embeddings, corresponding to each undirected edge between vertices $v_i$ and $v_j$ the search system 216 defines the joint probability between vertices $v_i$ and $v_j$ as:

$$p_1(v_i, v_j) = \frac{1}{Z} \cdot \frac{1}{1 + \exp(-\langle u_i, u_j \rangle)},$$

where $u_i \in \mathbb{R}^d$ is the d-dimensional vector representation of vertex $v_i$ and $$Z = \sum_{(v_i, v_j) \in E} \frac{1}{1 + \exp(-\langle u_i, u_j \rangle)}$$

is the normalization factor. The empirical probability $\hat{p}_1(\bullet, \bullet)$ over the space V×V can be calculated using:

$$\hat{p}_1(v_i, v_j) = \frac{w_{ij}}{W},$$

where $w_{ij}$ is the edge weight in the company graph, and $$W = \sum_{(v_i, v_j) \in E} w_{ij}.$$

The search system 216 may minimize the following objective function in order to preserve the first-order proximity:

$$O_1 = d(\hat{p}_1(\bullet, \bullet), p_1(\bullet, \bullet)),$$

where $d(\bullet, \bullet)$ is a measure of dissimilarity between two probability distributions. The search system 216 may choose to minimize KL-divergence of $\hat{p}_1$ with respect to $p_1$.

$$O_1 = -\sum_{(v_i, v_j) \in E} \hat{p}_1(v_i, v_j) \log\left(\frac{p_1(v_i, v_j)}{\hat{p}_1(v_i, v_j)}\right).$$

Second order embeddings are generated based on the observation that vertices with shared neighbors are similar. In this case, each vertex plays two roles: the vertex itself, and a specific context of other vertices. Let $u_i$ and $u_i'$ be two vectors, where $u_i$ is the representation of $v_i$ when it is treated as a vertex, while $u_i'$ is the representation of $v_i$ when it is used as a specific context. In some example embodiments, in learning second order embeddings, for each directed edge (i,j), the search system 216 defines the probability of context $v_j$ to be generated by vertex $v_i$ as follows:

$$p_2(v_j | v_i) = \frac{\exp(\langle u_j', u_i \rangle)}{\sum_{k=1}^{|V|} \exp(\langle u_k', u_i \rangle)}.$$

The corresponding empirical probability can be obtaines as:

$$\hat{p}_2(v_j | v_i) = \frac{w_{ij}}{W_i},$$

where $$W_i = \sum_{v_j : (v_i, v_j) \in E} w_{ij}.$$

In order to preserve the second order proximity, the search system 216 may aim to make conditional probability distribution of contexts, $p_2(\bullet|v_1)$, to be close to empirical probability distribution $\hat{p}_2(\bullet|v_i)$, by minimizing the following objective functions:

$$O_2 = \sum_{v_i \in V} \lambda_i \cdot d(\hat{p}_2(\bullet | v_i), p_2(\bullet | v_i)),$$

where $d(\bullet, \bullet)$ is a measure of dissimilarity between two probability distributions, and $\lambda_i$ represents the importance of vertex $v_i$. $\lambda_i$ can be set to be the degree of vertex $v_i$. Using KL-divergence as before, the objective function for the second order embeddings can be rewritten as:

$$O_2 = \sum_{v_i \in V} \lambda_i \cdot \sum_{v_j : (v_i, v_j) \in E} \hat{p}_2(v_j | v_i) \log\left(\frac{p_2(v_j | v_i)}{\hat{p}_2(v_j | v_i)}\right).$$

In some example embodiments, the search system 216 is configured to perform any combination of one or more of the following functions: constructing a weighted undirected graph over an entity of interest (e.g., skill, title, company), derived from an economic graph, wherein the number of members sharing the same entity on their profile is used to induce an edge weight between the vertices, learning first order embeddings from the graph, learning second order embeddings from the graph, and performing training and optimization to obtain these embeddings with a desired level of accuracy.

Figure 5:
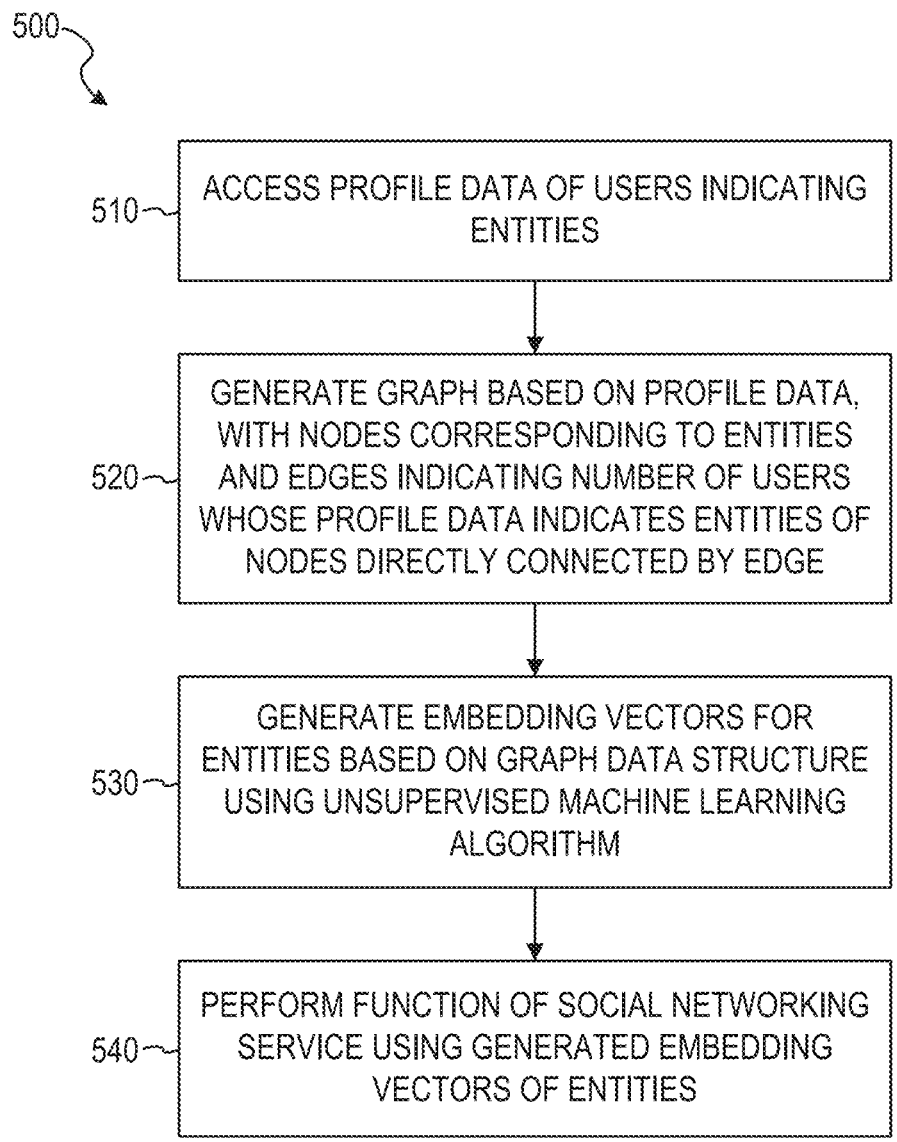
FIG. 5 is a flowchart illustrating a method of learning semantic representations using unsupervised embeddings, in accordance with an example embodiment.

FIG. 5 is a flowchart illustrating a method 500 of learning semantic representations using unsupervised embeddings, in accordance with an example embodiment. The method 500 can be performed by processing logic that can comprise hardware (e.g., circuitry, dedicated logic, programmable logic, microcode, etc.), software (e.g., instructions run on a processing device or a combination thereof. In one implementation, the method 500 is performed by the search system 216 of FIG. 2.

At operation 510, for each one of a plurality of users of a social networking service, the search system 216 accesses corresponding profile data of the user stored on a database of the social networking service. In some example embodiments, the accessed profile data of each user indicates at least one entity of a first facet type associated with the user. In some example embodiments, the first facet type comprises one of a job title, a company, a skill, a school, a degree, and an educational major.

At operation 520, the search system 216 generates a graph data structure based on the accessed profile data. In some example embodiments, the generated graph data structure comprises a plurality of nodes and a plurality of edges, with each one of the plurality of nodes corresponding to a different entity indicated by the accessed profile data, and each one of the plurality of edges directly connecting a different pair of the plurality of nodes and indicating a number of the plurality of users whose profile data indicates both entities of the pair of nodes that are directly connected by the edge.

At operation 530, the search system 216 generates a corresponding embedding vector for each one of the entities indicated by the accessed profile data using an unsupervised machine learning algorithm. In some example embodiments, the unsupervised machine learning algorithm is configured to optimize the corresponding embedding vector of each one of the entities to result in a level of similarity between the corresponding embedding vectors of two entities increasing as the number of the plurality of users whose profile data indicates the two entities increases. In some example embodiments, the unsupervised machine learning algorithm is further configured to optimize the corresponding embedding vector of each one of the entities to result in a level of similarity between the corresponding embedding vectors of two entities increasing as the number of neighbor nodes shared by the two entities increases. In some example embodiments, the embedding vectors for the plurality of entities are generated using a neural network.

At operation 540, the search system 216 performs a function of the social networking service using the generated embedding vectors of the entities. In some example embodiments, the function comprises receiving, from a client computing device, a search query indicating an entity of the first facet type, generating one or more search results for the search query using the generated embedding vectors of the entities, with the one or more search results comprising at least one of the plurality of users, and causing the one or more search results to be displayed on the client computing device.

It is contemplated that any of the other features described within the present disclosure can be incorporated into the method 500.

As previously discussed, a significant challenge for candidate search ranking is the sheer number of available entities that a recruiter can include as part of their search, and how to utilize them for candidate selection as well as ranking. For example, the recruiter can choose from tens of thousands of standardized skills. Since different entities could be related to each other (to a varying degree), using syntactic features (e.g., fraction of query skills possessed by a candidate) has its limitations. Instead, the search system 216 may utilize semantic representations of entities, for example, in the form of low dimensional embeddings. Such representations allow for the sparse and numerous entities to be better incorporated as part of a machine learning model. In some example embodiments, the search system 216 employs an application of representational learning for entities in the candidate search domain, utilizing application specific data from the candidate search domain, and learning such representations using a supervised approach that utilizes the member engagements in historical search results.

In some example embodiments, to train the entity embeddings in a supervised manner, the search system 216 first collects the training data from candidates recommended to the recruiters (e.g., with the inMail, or other message, accept events as the positive labels), and then learns the feature representations for the entities guided by the labeled data. In some example embodiments, a Deep Semantic Structured Model (DSSM) based learning architecture is used by the search system 216. The query and document text may be converted to character trigrams, which can be used as inputs to the model. A vector representation for each character trigram can be learned using the training procedure. In some example embodiments, this scheme is extended to add categorical representations of each type of entity as inputs to the DSSM model.

In some example embodiments, the search system 216 uses word-hashing. In one example, suppose that a query has the title id $t_i$ selected as a facet, and contains the search box keyword "java". The search system 216 may process the text to generate the following trigrams: (#ja, jav, ava, va #. Next, the search system 216 may add the IDs corresponding to the selected entities (e.g., $t_i$ in this example) as inputs to the model. The search system 216 may add entities from the facet to the existing model, since text alone may not be powerful enough to encode the semantics. After word hashing, a multi-layer non-linear projection (e.g., comprising multiple fully connected layers) is performed to map the query and the documents to a common semantic representation. Finally, the similarity of the document to the query is calculated using a vector similarity measure (e.g., cosine similarity) between their vectors in the new learned semantic space.

Figure 6:
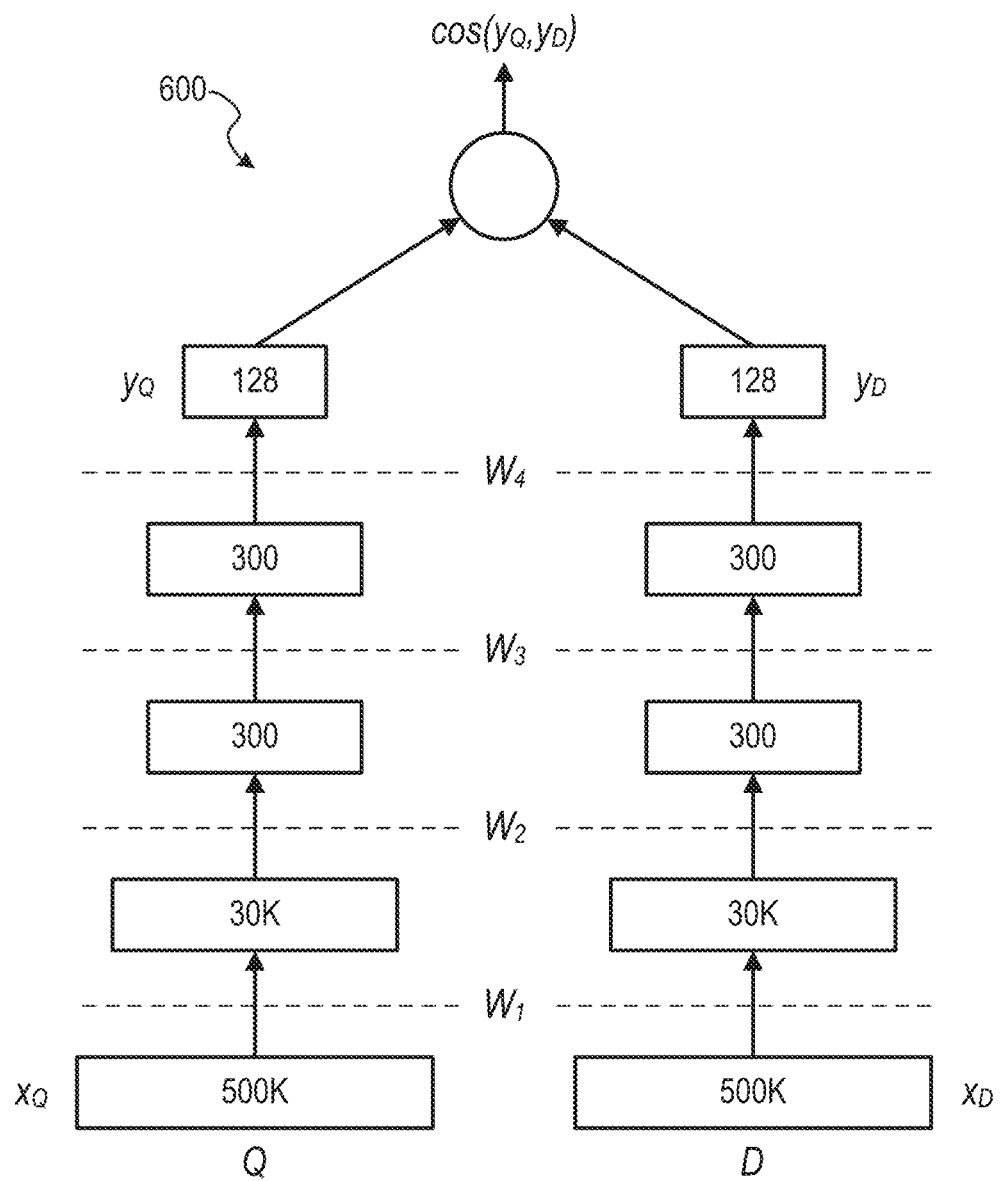
FIG. 6 illustrates a visualization of a deep neural network architecture, in accordance with an example embodiment.

FIG. 6 illustrates a visualization of a deep neural network architecture 600, in accordance with an example embodiment. In FIG. 6, training data is fed into the deep neural network architecture 600. The tracking data can be broken down into the query Q and a bunch of documents D. In the candidate search case, the query can be a faceted query (e.g., query text plus entities, such as title, company, skills, etc.). Each facet has a corresponding vector representation, and a query can be represented by a concatenation of all of the facets that it identifies. So, the $x_Q$ layer is a concatenation of all of the facets of a query, and the document is a member that the recruiter is trying to retrieve. A member's profile has a lot of facets that can each be represented as a vector and can be represented as a concatenation of all of these facets, which is the layer $x_D$. Once the search system 216 has these two vector representations, it can use the similarity between these two to say that if the query and the document are similar, then they should be ranked higher. If not, then they can be moved down the list. However, the problem is that initially these vectors are randomly initialized. The purpose of the supervised representation is to have labels at the end of training. In some example embodiments, the search system 216 performs backpropagation so that the members that are similar to the query have a vector representation that is similar in vector space, and a member that is not similar to the query is dissimilar in vector space.

Backpropagation is an algorithm for supervised learning of artificial neural networks using gradient descent. Given an artificial neural network and an error function, the algorithm calculates the gradient of the error function with respect to the neural network's weights. It is a generalization of the delta rule for perceptrons to multilayer feedforward neural networks. Calculation of the gradient proceeds backwards through the network, with the gradient of the final layer of weights being calculated first and the gradient of the first layer of weights being calculated last. Partial computations of the gradient from one layer are reused in the computation of the gradient for the previous layer. This backwards flow of the error information allows for efficient computation of the gradient at each layer versus the naive approach of calculating the gradient of each layer separately.

In FIG. 6, architecture 600 comprises multiple layers W, such as layer $W_1$, layer $W_2$, layer $W_3$, and layer $W_4$. Each layer W is a matrix with a non-linearity at the output of the matrix, and each layer W reduces the representation to fewer numbers. The purpose of using multiple layers W is that each layer infuses a non-linearity in the training process, which helps with entities being learned automatically through backpropagation. In FIG. 6, $y_Q$ and $y_D$ correspond to the supervised embeddings for the query and the document respectively. A percent similarity between $y_Q$ and $y_D$, such as the cosine similarity of $y_Q$ and $y_D$, may be used as the output. In some example embodiments, the search system 216 compares the output of the architecture 600 to the training label, which is either a 1 (e.g., if the member was clicked on by the recruiter after the query was issued) or 0 (e.g., if the member was ignored or not clicked on by the recruiter after the query was issued). The objective of the training is to get the cosine similarity as close to 1 as possible for members clicked on and as close to 0 as possible for members ignored or not clicked on. At the end of the training process, what you are left with is a vector for every facet of the query and a vector for every facet of a member, such that if you construct a query and construct a member from those vectors, a member that is similar to the query will have a very high cosine similarity and a member that is dissimilar to the query will have a low cosine similarity. The cosine similarity, or some other similarity measurement, may then be used as a feature in the final ranking model.

Figure 7:
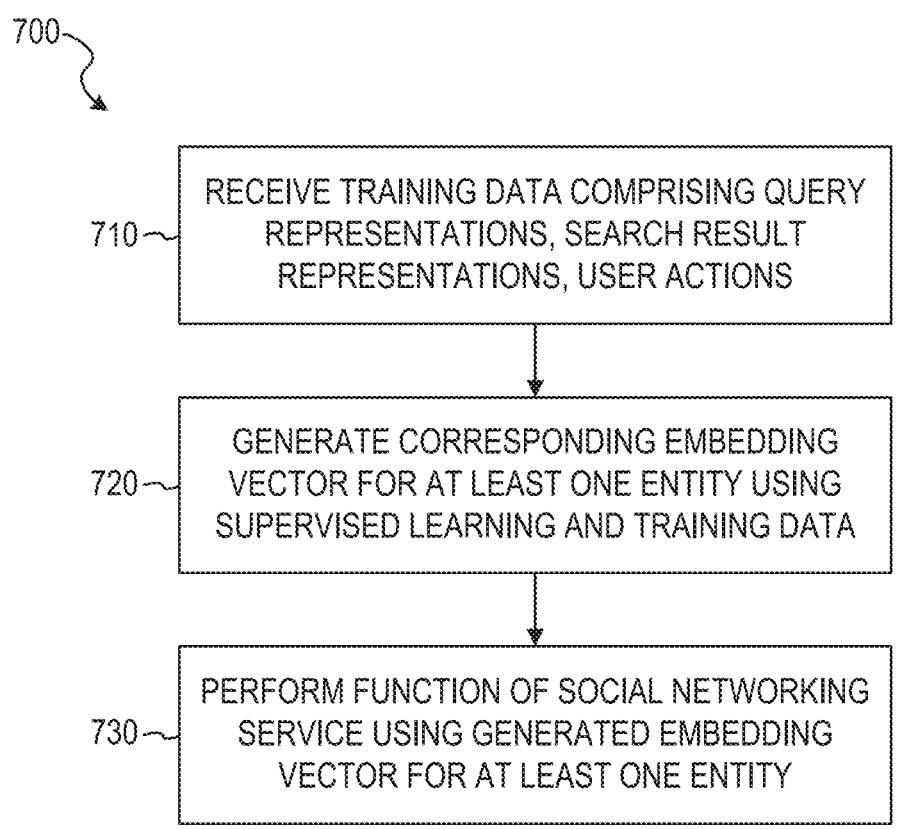
FIG. 7 is a flowchart illustrating a method of generating supervised embedding representations using deep semantic structured models for search, in accordance with an example embodiment.

FIG. 7 is a flowchart illustrating a method 700 of generating supervised embedding representations using deep semantic structured models for search, in accordance with an example embodiment. The method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the search system 216 of FIG. 2.

At operation 710, the search system 216 receives training data comprising a plurality of query representations, a plurality of search result representations for each one of the plurality of query representations, and a plurality of user actions for each one of the plurality of query representations. In some example embodiments, each one of the plurality of query representations represents at least one entity included in a corresponding search query submitted by a querying user, the corresponding plurality of search result representations for each one of the plurality of query representations represents a plurality of candidate users displayed in response to the plurality of search queries based on profile data of the plurality of candidate users stored on a database of a social networking service, and the plurality of user actions comprises actions by the querying user directed towards at least one candidate user of the plurality of search results for the corresponding search query.

In some example embodiments, the at least one entity comprises one of a job title, a company, a skill, a school, a degree, and an educational major. However, other types of entities are also within the scope of the present disclosure.

In some example embodiments, the user actions comprise at least one of selecting to view additional information of the candidate users and sending messages to the candidate users. In some example embodiments, the training data further comprises a corresponding reaction indication for each one of the plurality of user actions, with each reaction indication indicating whether the candidate user to whom the corresponding user action was directed responded to the corresponding user action with at least one of one or more specified responses. In some example embodiments, the user actions comprise sending messages to the candidate users, and the one or more specified responses comprise at least one of accepting the message, viewing the message, and sending a reply message to the querying user.

At operation 720, the search system 216 generates a corresponding embedding vector for each one of the at least one entity using a supervised learning algorithm and the received training data. In some example embodiments, the generating the corresponding embedding vector for each one of the at least one entity comprises using a neural network. In some example embodiments, the supervised learning algorithm comprises a backpropagation algorithm.

At operation 730, the search system 216 performs a function of the social networking service using the generated embedding vector for each one of the at least one entity. In some example embodiments, the performing the function comprises receiving, from a client computing device, a search query indicating an entity, generating one or more search results for the search query using the generated embedding vectors of the entities, with the one or more search results comprising indications of at least one user of the social networking service, and causing the one or more search results to be displayed on the client computing device.

It is contemplated that any of the other features described within the present disclosure can be incorporated into the method 700.

In some example embodiments, the search system 216 is configured to perform one or more of the following functions: constructing a deep semantic structured model architecture for a candidate search application setting, learning the supervised embeddings by using training data obtained from candidates recommended to the recruiters (e.g., with the inMail, or other message, accept events as the positive labels), performing training and optimization to obtain these embeddings with the desired level of accuracy via a DSSM architecture, and tuning the DSSM architecture and determining the network structure (e.g., number of layers, the dimension for each layer, etc) for candidate search applications.

Figure 8:
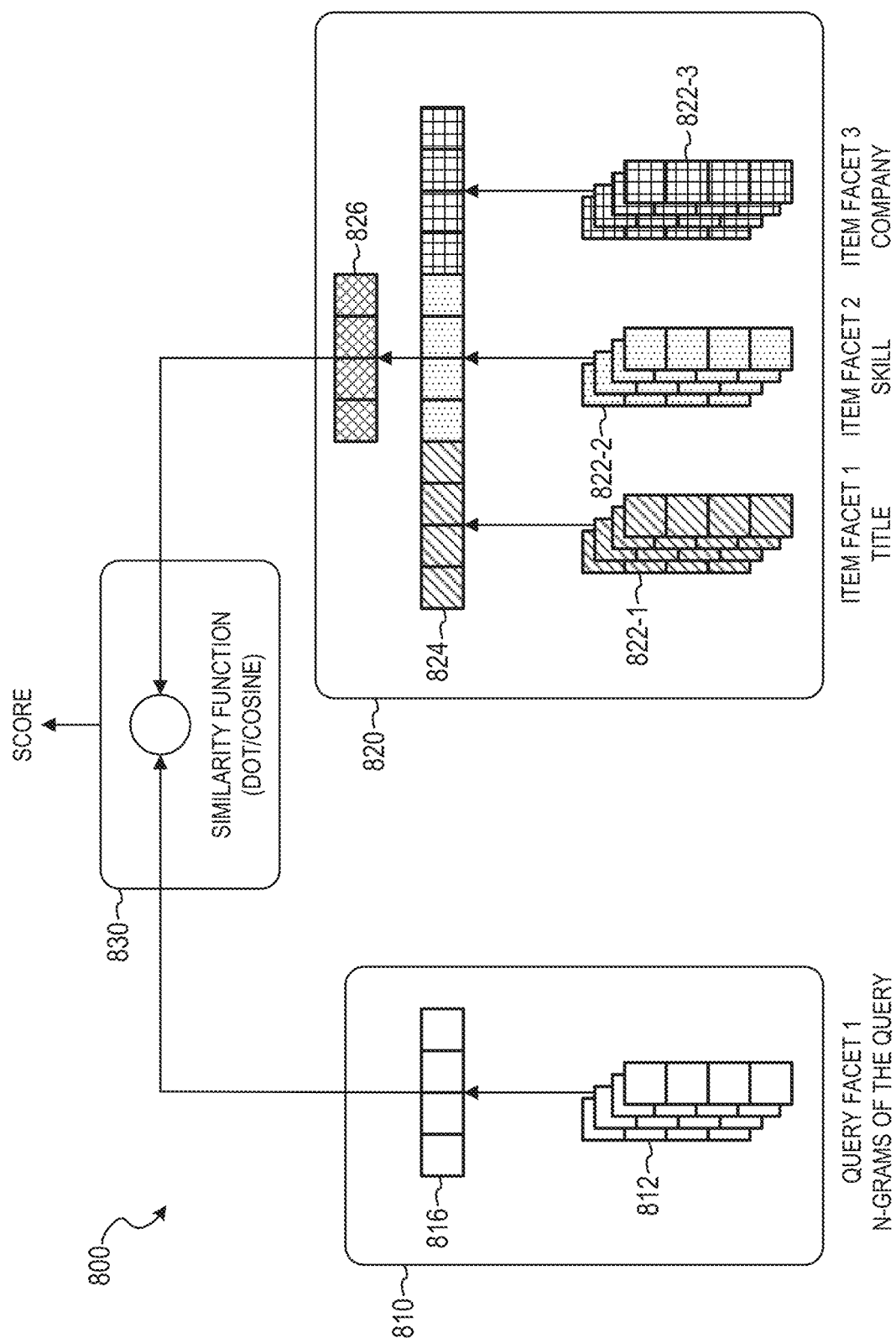
FIG. 8 illustrates an architecture of neural networks, in accordance with an example embodiment.

FIG. 8 illustrates an architecture 800 of neural networks, in accordance with an example embodiment. In some example embodiments, the architecture 800 comprises a query system 810 comprising a neural network, an item system 820 comprising a neural network, and a scoring system 830 comprising a neural network. In some example embodiments, the query system 810, the item system 820, and the scoring system 830 are implemented on separate physical computer systems, with each one of the separate physical computer systems having its own set of one or more hardware processors separate and distinct from the other separate physical computer systems.

The query system 810 is configured to generate a query vector representation for a query based on the query. In some example embodiments, the query is submitted by a computing device of a user of an online service and comprises at least one keyword entered by the user. In some example embodiments, the query also comprises facet data, such as one or more facet selections.

The item system 820 is configured to, for each one of a plurality of items stored on a database of an online service, retrieve (or otherwise receive) item data of the item from the database of the online service, and to generate an item vector representation based on the retrieved item data of the item. In some example embodiments, the plurality of items comprises a plurality of documents. For example, the plurality of items may comprise a plurality of documents searchable using a general purpose online search engine. In some example embodiments, the plurality of items comprises a plurality of member profiles of a social networking service, such as the member profiles stored in the database 218 in FIG. 2. However, other types of items are also within the scope of the present disclosure.

The scoring system 830 is configured to, for each one of the plurality of items, generate a corresponding score for a pairing of the item and the query based on the item vector representation of the item and the query vector representation. The scores of the query-item pairings may then be used by the search system 216 to generate search results for the query, such as by ranking the items based on their scores, and then displaying at least a portion of the items based on their ranking.

In some example embodiments, the query system 810, the item system 820, and the scoring system 830 each comprise a deep neural network. In some example embodiments, the item system 820 comprises a convolutional neural network. However, it is contemplated that other types and configurations of the query system 810, the item system 820, and the scoring system 830 are also within the scope of the present disclosure.

In the example embodiment of FIG. 4, the input to the architecture 800 is a combination of text and facet attributes. Each input layer of the neural networks of the query system 810 and the item system 820 converts the incoming attribute/text (n-gram) 812 and 822, respectively, from a list of categorical features to a single embedding (e.g., via pooling) and an aggregation layer stacks embeddings from multiple attributes to one vector representation. In some example embodiments, the vector representation 824 of each attribute is concatenated into a single vector representation 826 of the item. Since the item (e.g., member) arm has a richer source of input data, there is more opportunity to learn representative structures. This intuition manifests itself via a deeper and structurally richer (i.e., convolutions) item arm that eventually produces the item representation 826. The shorter query arm of the query system 810 leverages query text and facets selected by the user in the search user interface to produce the query representation 816. The similarity layer of the scoring system 330 (e.g., using a fully-connected, cosine, or any distance function) processes the query representation 816 and the item representation 826 to produce a score that captures semantic similarity between the two representations 816 and 826.

In some example embodiments, the architecture 800 is employed by the search system 216 and enables the search system 216 to assign a globally unique identifier (UID) for each item (e.g., each document), for example, a member identification for each member profile, as well as to search over both offline indexes and real-time updates at the same time, and plug in any relevance functions and algorithms, freeing them from using a fixed scoring framework. Users can design their own relevance functions on a rich set of information about search hits, including term frequency, document frequency, matched terms, and any metadata associated with a search hit document.

In some example embodiments, relevance modules can be plugged into the architecture 800 of the search system 216 to gather raw results from a search, and implement sorting or custom result filtering, collation, and so on. In some example embodiments, the search system 216 may collect the raw search results, collect the forward index, and provide a pluggable scoring mechanism, which users can use as a data provider that offers the information of a search hit, document info (e.g., from the forward index) or any other custom information (e.g., from the forward index), and apply any relevance functions on the data.

In some example embodiments, the scoring system 830 computes the similarity sim(q,m) between a query q that contains terms $\{t_1, t_2, \ldots\}$ and member in that has attributes $\{a_1, a_2, \ldots\}$. The terms and member attributes may be keywords, tokens, or attributes of a user profile, such as skills, titles, or company/school the user identifies with. In some example embodiments, the search system 216 uses latent representations to compute similarity sim(q,m). The search system 216 may learn representations for different types of entities. For example, the search system 216 may use the representation of the entire query and the entire member profile. The search system 216 may alternatively use a representation of an individual query term and member attribute.

In some example embodiment, the search system 216 uses token level embeddings, using the embedding vectors (e.g., latent representations) of query terms (e.g., tokens) $\{t_1, t_2, \ldots\}$ and member attributes (e.g., tokens) $\{a_1, a_2, \ldots\}$ to compute the query-member similarity. The token embeddings may be used to compute sim(q,m) in one of the following ways.

In the first way, the search system 216 aggregates the similarity between individual query terms and member attributes sim($t_i$, $a_k$). Each similarity score can be added as a feature to a linear model. The advantages of such as model are: (1) Easy path to productionization, such as by using an off-heap dictionary (or key-value store) containing the token embeddings in the online service; and (2) No loss of information for tail queries or rare documents, since the information stored is at the token level. However, some disadvantages of this approach are that: (1) The dictionary size has limitation because it is challenging to store more than a couple of hundreds of NIB; and (2) If the query contains a lot of terms, and the member has a lot of attributes, then computing similarities can be pretty time-consuming.

In the second way, the search system 216 uses a nonlinear function such as neural networks to get a query-member similarity using the token level embeddings as features. The advantage of using nonlinearity is the richer set of interaction features that can be extracted from the raw data. However, as one stacks on layers in the network, the latency to score the function gets expensive. The additional cost comes from the fact that, for each query, thousands of members need to be scored at run-time. In some example embodiments, the search system 216 uses this approach in a downstream (e.g., broker) re-ranker that has significantly fewer query-member pairs as compared to the primary ranker in the search nodes.

In some example embodiments, the search system 216 uses document level embeddings, retrieving the representation (e.g., embedding) for the entire query and the member (e.g., document or other type of item). This solution is particularly useful when the query distribution has a long tail, such as when the head queries serve a significant portion of the online search traffic. In such a situation, the search system 216 can learn a complex function to represent the query and the member, and store the resulting query and member representations in key-value stores. In some example embodiments, the search system 216 alternatively uses an external key-value store to persist the member representation in order to provide a workaround for other search verticals and address the issue of space limitations and latency issues for storing such dense real-valued vectors in a forward index.

However, the design of some search systems restricts the search nodes from making external service calls. In some example embodiments, the search system 216 uses a hybrid approach. Since the query distribution for certain types of search (e.g., recruiter searches) does not have a long tail, in some example embodiments, the search system 216 does not use the document level embedding to pre-compute the query representation. Additionally, since the number of members that need to be scored for each query is may be of the order of a hundred thousand or greater, in some example embodiments, the search system 216 does not use token level representation for the member side because the memory and latency considerations are restrictive. In some example embodiments, the search system 216 uses a hybrid approach using token level embeddings for one of the two sides and document level embeddings for the other side.

In some example embodiments, the architecture 300 of the search system 216 employs a design principle of dividing and conquering. The architecture 800 may comprise three main parts while serving a query-member pair: (1) Offline distributed processing to process offline data and lower the load on the online system in document processing and index preparation; (2) Online query processing for receiving the search request and performing an early evaluation and processing of the query; and (3) Searchers—the distributed platform carrying the index and performing the search based on the processed query and previously prepared offline data. In some example embodiments, the search system 216 employs a modularization of this design principle, semantically splitting the architecture 800 so that offline processing corresponds to the item (e.g., member) system 820, online processing corresponds to the query system 810, and searchers correspond to the cross network of the scoring system 830. This implementation makes use of this pairing for executing and scoring of each piece of the model.

In some example embodiments, the architecture 300 of the search system 216 provides a search-as-a-service infrastructure for a cross network as the final scoring, such as for the scoring system 830. The offline generated member representation and REST service generated query representation may be unified on the search nodes where the final piece of the scorer is evaluated.

In some example embodiments, the search system 216 employs an approach to learning the embeddings that combines signals, specifically, signals present in the graphs discussed above and signals present in recruiter-candidate interaction data linked with historical search results. This approach results in faster convergence for the supervised approaches that learn using recruiter-candidate interaction data.

In some example embodiments, the search system 216 is configured to generate initial embeddings for entities, such as member, title, skill, and company, from one or more graph data structures based on collaborative filtering, co-occurrence relationship, or the combination. For example, in some example embodiments, the search system 216 uses the following approach:

(a) Form a weighted undirected graph over an entity of interest (e.g., skill, title, company), using the number of members sharing the same entity on their profile to induce an edge weight between the vertices.

(b) Form a weighted undirected graph over an entity of interest (e.g., skill, title, company), using the number of members mentioning two entities in their profile to induce an edge weight, $w_2$ between the vertices (e.g., if 10000 members include both "machine learning" and "hadoop" as skills in their profiles, the edge weight between "machine learning" and "hadoop" will be 10000).

(c) Form a weighted undirected graph over an entity of interest (e.g., skill, title, company), combining the above two signals, after normalization (d) Given such a weighted directed graph, learn first order embeddings and second order embeddings from the graph by applying a Large-Scale Information Network Embeddings (LINE) technique, wherein training and optimization are performed to obtain these embeddings with the desired level of accuracy.

In some example embodiments, the search system 216 is further configured to seed the supervised learning approaches discussed above with the above unsupervised embeddings as starting points, to tune the network structure and parameter choices, and to perform training and optimization to achieve the final embeddings, combining the unsupervised and supervised approaches. For many entities, there may not be sufficient data from recruiter-candidate interactions. For such entities, the search system 216 may default to the initial unsupervised embeddings. Even for entities with sufficient data from recruiter-candidate interactions, bootstrapping with the initial unsupervised embeddings helps to achieve faster convergence, and greater likelihood of convergence to globally optimal embeddings (as opposed to locally optimal embeddings). Given the unsupervised embeddings, the search system 216 may apply a deep semantic structured model (DSSM) architecture in the candidate search application setting as follows:

(a) Generate training data obtained from candidates recommended to the recruiters (e.g., with the inMail accept events as the positive labels).

(b) Seed the optimization step with the unsupervised embeddings obtained by applying the LINE technique on the weighted graph.

(c) Perform training and optimization to obtain the supervised DSSM based embeddings with the desired level of accuracy.

(d) Tune the network structure and parameters. The search system 216 can determine the relative weight given to the initial embeddings by tuning the number of iterations and the learning rate, and the update persistence factor (e.g., the weight given to the previous value in each iterative update). The network structure and the above parameters can be optimized using a labeled data set (e.g., a validation set), by performing a grid search and convex optimization to determine the set of parameter choices that result in least error on the validation set.

In some example embodiments, the search system 216 is configured to first train all of the entity representations using the unsupervised approach (e.g., train using the graph data structure), and then use those unsupervised trained representations as the starting point to train the supervised embeddings using the output of the unsupervised vectors.

Figure 9:
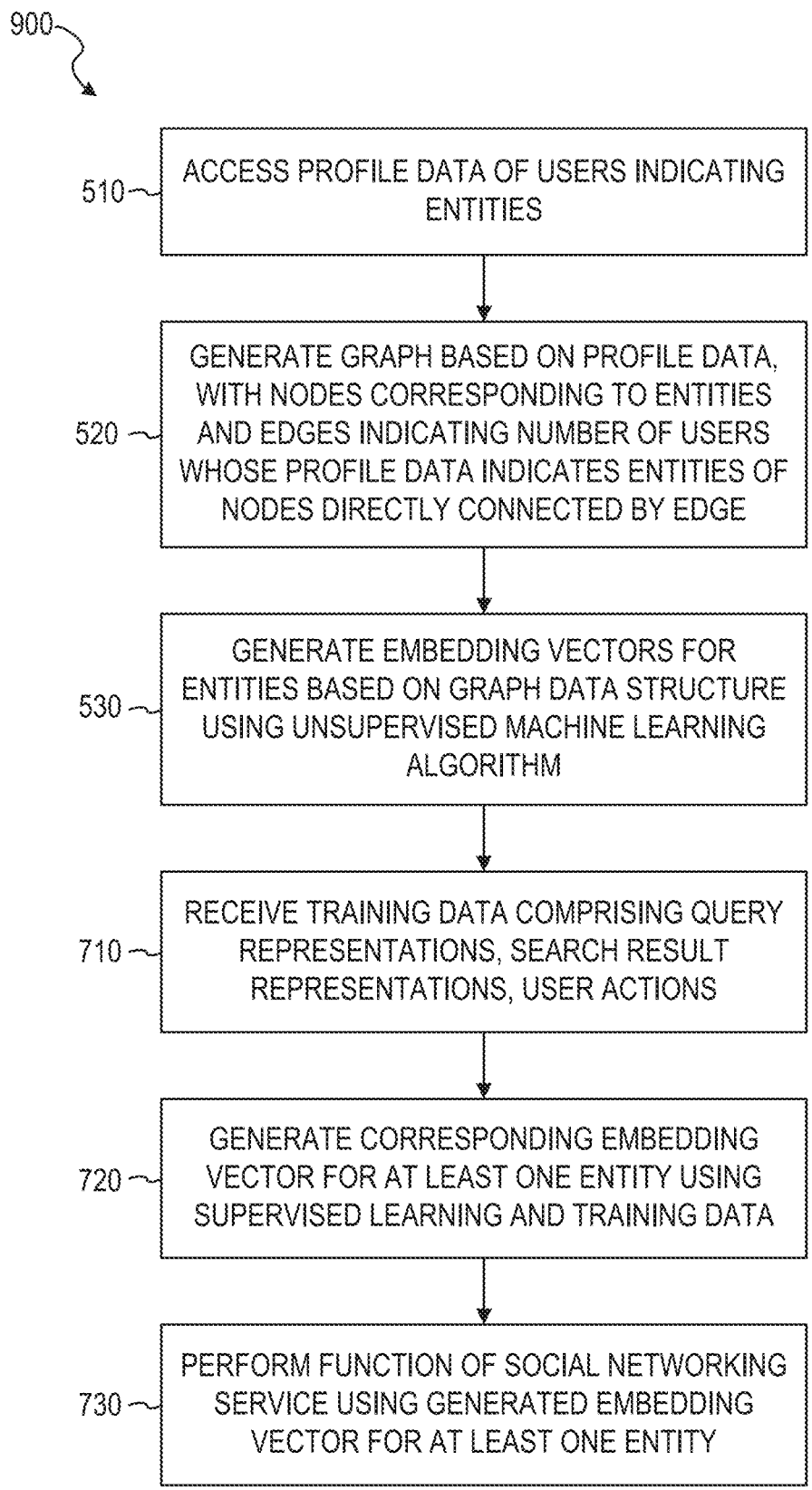
FIG. 9 is a flowchart illustrating a method of combining supervised and unsupervised approaches to generate embedding representations of entities for search, in accordance with an example embodiment.

FIG. 9 is a flowchart illustrating a method 900 of combining supervised and unsupervised approaches to generate embedding representations of entities for search, in accordance with an example embodiment. The method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by the search system 216 of FIG. 2.

At operation 510, the search system 216, for each one of a plurality of reference users of a social networking service, accesses corresponding profile data of the reference user stored on a database of the social networking service. In some example embodiments, the accessed profile data of each reference user indicates at least one entity of a first facet type associated with the reference user. In some example embodiments, the at least one entity comprises one of a job title, a company, a skill, a school, a degree, and an educational major. However, other types of entities are also within the scope of the present disclosure.

At operation 520, the search system 216 generates a graph data structure based on the accessed profile data. In some example embodiments, the generated graph data structure comprises a plurality of nodes and a plurality of edges, with each one of the plurality of nodes corresponding to a different entity indicated by the accessed profile data, and each one of the plurality of edges directly connecting a different pair of the plurality of nodes and indicating a number of the plurality of reference users whose profile data indicates both entities of the pair of nodes that are directly connected by the edge.

At operation 530, the search system 216 generates a corresponding initial embedding vector for each one of the entities indicated by the accessed profile data using an unsupervised machine learning algorithm. In some example embodiments, the unsupervised machine learning algorithm is configured to optimize the corresponding embedding vector of each one of the entities to result in a level of similarity between the corresponding embedding vectors of two entities increasing as the number of the plurality of users whose profile data indicates the two entities increases. In some example embodiments, the unsupervised machine learning algorithm is further configured to optimize the corresponding embedding vector of each one of the entities to result in a level of similarity between the corresponding embedding vectors of two entities increasing as the number of neighbor nodes shared by the two entities increases. In some example embodiments, the initial embedding vectors for the plurality of entities are generated using a neural network.

At operation 710, the search system 16 receives training data comprising a plurality of query representations, a plurality of search result representations for each one of the plurality of query representations, and a plurality of user actions for each one of the plurality of query representations. In some example embodiments, each one of the plurality of query representations comprises the corresponding initial embedding vector of at least one entity included in a corresponding search query submitted by a querying user, the corresponding plurality of search result representations for each one of the plurality of query representations represents a plurality of candidate users displayed in response to the plurality of search queries based on profile data of the plurality of candidate users stored on the database of the social networking service, and the plurality of user actions comprises actions by the querying user directed towards at least one candidate user of the plurality of search results for the corresponding search query. In some example embodiments, the user actions comprise at least one of selecting to view additional information of the candidate users and sending messages to the candidate users. In some example embodiments, the training data further comprises a corresponding reaction indication for each one of the plurality of user actions, each reaction indication indicating whether the candidate user to whom the corresponding user action was directed responded to the corresponding user action with at least one of one or more specified responses. In some example embodiments, the user actions comprise sending messages to the candidate users, and the one or more specified responses comprise at least one of accepting the message, viewing the message, and sending a reply message to the querying user.

At operation 720, the search system 216 generates a corresponding final embedding vector for each one of the at least one entity using a supervised learning algorithm and the received training data. In some example embodiments, the generating the corresponding embedding vector for each one of the at least one entity comprises using a neural network. In some example embodiments, the supervised learning algorithm comprises a backpropagation algorithm.

At operation 730, the search system 216 performs a function of the social networking service using the generated final embedding vector for each one of the at least one entity. In some example embodiments, the performing the function comprises receiving, from a client computing device, a search query indicating an entity, generating one or more search results for the search query using the generated final embedding vectors of the entities, with the one or more search results comprising indications of at least one user of the social networking service, and causing the one or more search results to be displayed on the client computing device.

It is contemplated that any of the other features described within the present disclosure can be incorporated into the method 900.

In some example embodiments, the search system 216 is configured to perform any combination of one or more of the following functions: generate member embeddings as part of an offline workflow for index building, and to periodically update the index; compute query embedding as part of the online system architecture; compute query-member similarity using deep semantic features; compute the similarity as the dot product or cosine similarity between the corresponding embedding vectors; learn a ranking model where the query-member similarity based on deep semantic features is used as a feature; perform the scoring in multiple passes, and to retrieve the member embeddings only for those members that are deemed relevant by the first pass scoring model, thereby resulting in lower latency; retrieve relevant candidate set and compute the query embedding in parallel towards reducing end-to-end latency; and split the network scoring of query-member pair into three semantic pieces, namely query network, member network, and cross network, for scalability.

Figure 10:
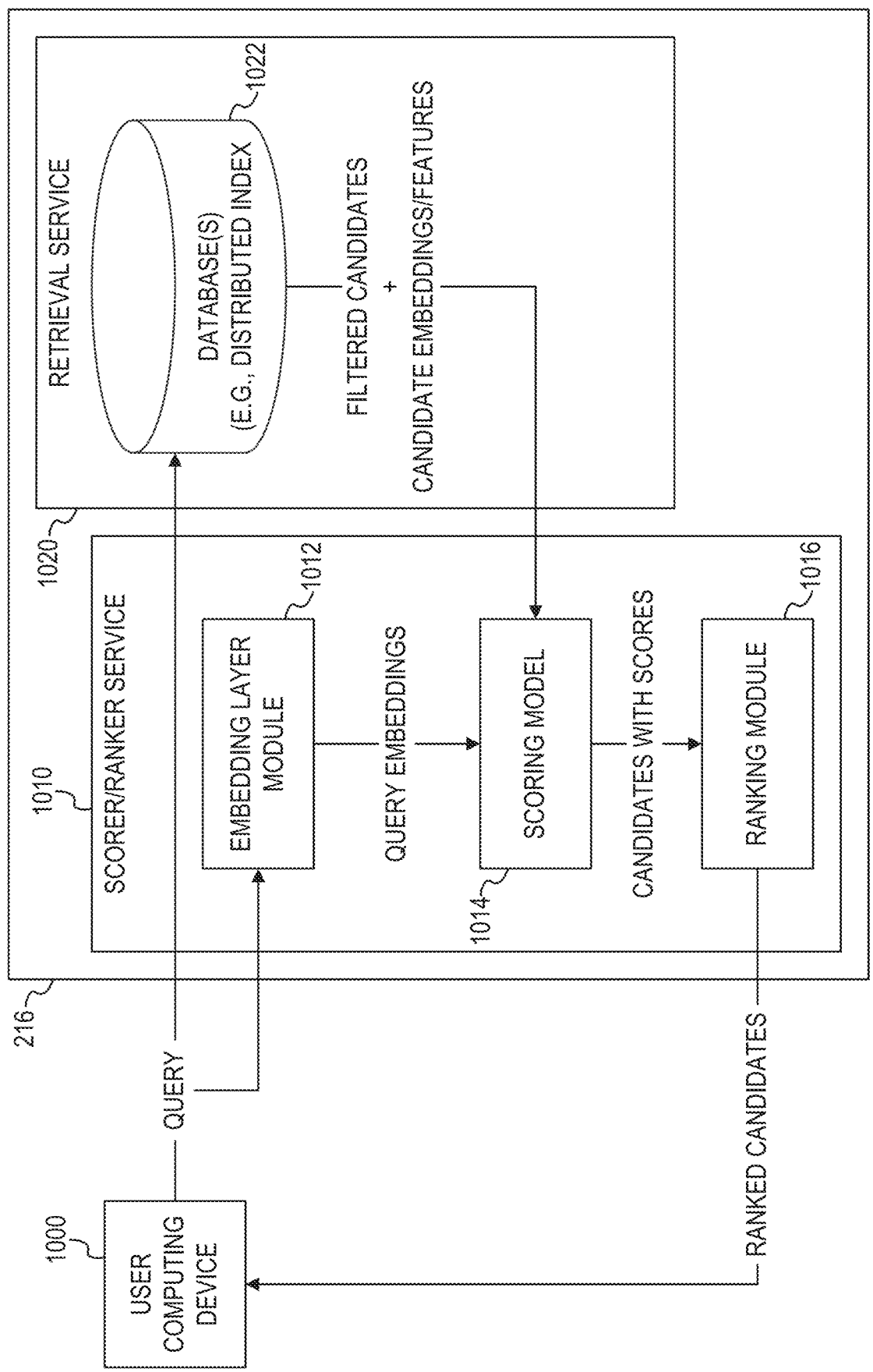
FIG. 10 illustrates an architecture for processing search queries, in accordance with an example embodiment.

FIG. 10 illustrates an architecture for processing search queries, in accordance with an example embodiment. In FIG. 10, the architecture comprises a scorer/ranker service 1010 and a retrieval service 1020 communicatively coupled to each other. In some example embodiments, the member (e.g., candidate) embeddings are computed offline, but the query embeddings are computed at run time. This approach provides a few technical improvements. First, since a large number of members may match a query, computing the embeddings for these members at run time would be computationally expensive. Therefore, computing the embeddings for the members ahead of time offline significantly decreases the computational expense at runt time and increases the speed and efficienty of the computer system. Second, the queries are typically not known ahead of time, and hence the embeddings are generated online. Consequently, in some example embodiments, the architecture 1000 is configured to include member embeddings as part of the forward index containing member features, which is generated periodically by an offline workflow.

In some example embodiments, a user, such as a recruiter, used a user computing device 1000 to submit a query, such as one of the queries discussed above. The retrieval service 1020 receives the query, generates the candidate set of members that match the criteria specified in the query, and computes an initial scoring of the retrieved candidates using a simple, first-pass model. These candidates, along with their features, are retrieved from one or more databases 1022, such as a distributed index, and returned to the scoring/ranking service 1010. The features associated with each member can be grouped into two categories, explicit features and derived features. The explicit features correspond to fields that are present in a member profile, including, but not limited to, current and past work positions, education, and skills listed by the member. The derived features may either be derived from a member's profile (e.g., implied skills, experience, etc.) or constructed by an external algorithm (e.g., low-dimensional vector embedding for a member). The retrieval service 1020 handles the selection of candidates matching the query, and the initial (first pass) scoring/pruning of these candidates, in a distributed fashion.

The scorer/ranker service 1010 is responsible for the second-pass scoring and ranking of candidates corresponding to each query, and returning the ranked list of candidates to the front-end system for display on the user computing device 1000. Given a query, the scorer/ranker service 1010 fetches the matching candidates, along with their features, from the retrieval service 1020, and in parallel, computes the vector embedding for the query using an embedding layer module 1012. Then, the scorer/ranker service 1010 performs the second-pass scoring of these candidates, which includes generation of similarity features based on query and member embeddings, using a scoring module 1014, and returns the top ranked results using a ranking module 1016. The second-pass scoring can be performed either by a deep learning based model, or any other machine-learned model (e.g., a gradient boosted decision tree model, periodically trained and updated as part of an offline workflow).

Figure 11:
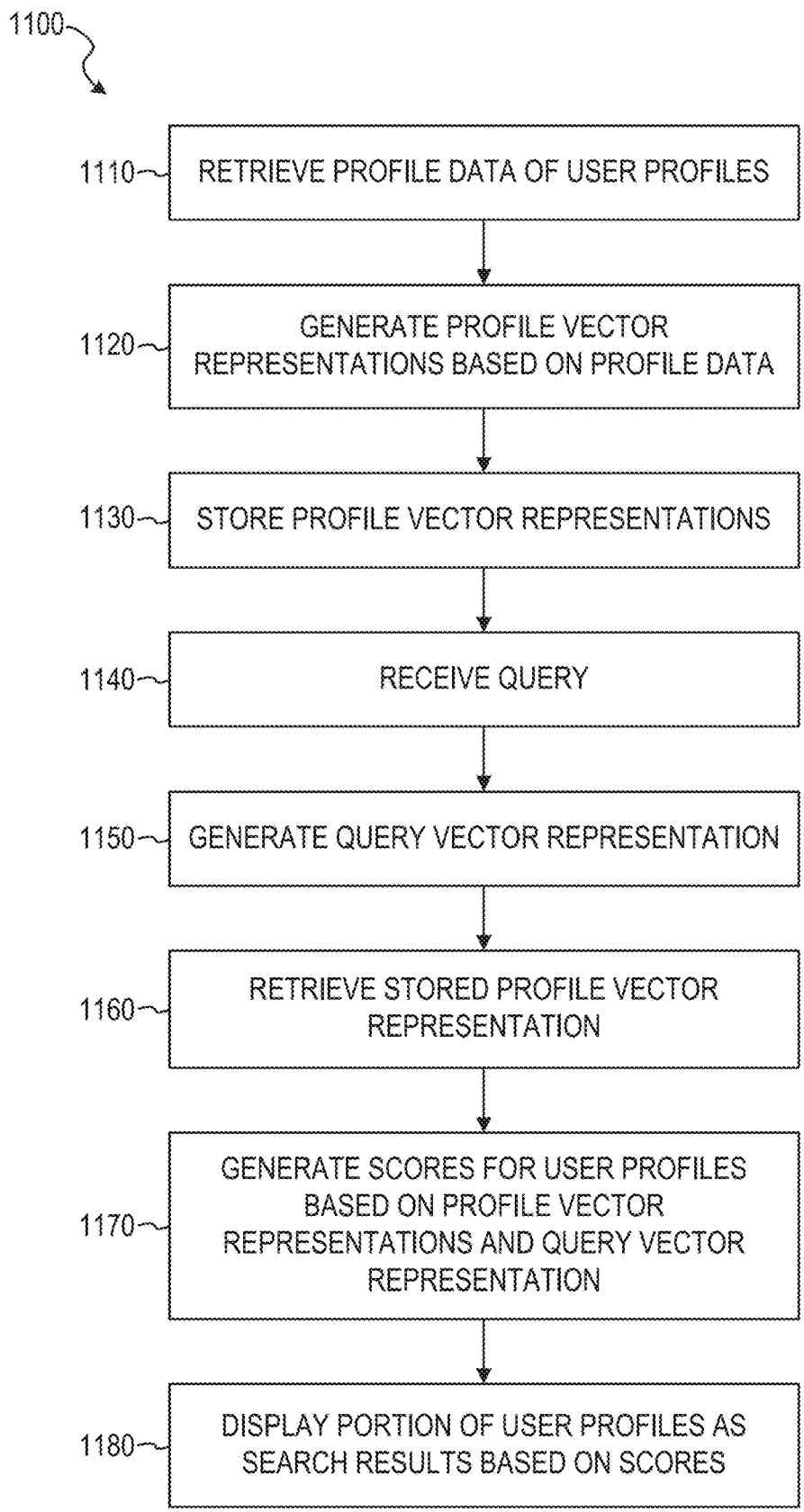
FIG. 11 is a flowchart illustrating a method of generating search results for search queries using deep semantic features, in accordance with an example embodiment.

FIG. 11 is a flowchart illustrating a method 1100 of generating search results for search queries using deep semantic features, in accordance with an example embodiment. The method 1100 can be performed by processing logic that can comprise hardware (e.g., circuitry, dedicated logic, programmable logic, microcode, etc. software (e.g., instructions run on a processing device), or a combination thereof. In one implementation, the method 1100 is performed by the search system 216 of FIG. 2.

At operation 1110, the search system 216, for each one of a plurality of user profiles stored on a database of a social networking service, retrieves, using a first neural network, profile data of the one of the plurality of user profiles from the database of the social networking service. In some example embodiments, the profile data comprises at least one of a job title, a company, a skill, a school, a degree, and an educational major. However, other types of profile data are also within the scope of the present disclosure.

At operation 1120, the search system 216, for each one of the plurality of user profiles, generates, using the first neural network, a profile vector representation based on the retrieved profile data of the one of the plurality of user profiles.

At operation 1130, the search system 216 stores the profile vector representations of the plurality of user profiles in the database of the social networking service.

At operation 1140, the search system 216 receives a query from a computing device of a querying user subsequent to the storing of the profile vector representations. In some example embodiments, the query comprises query data, and the query data comprises at least one of query text or facet selection data.

At operation 1150, the search system 216 generates, using a second neural network distinct from the first neural network, a query vector representation for the query based on the query data of the query in response to the receiving of the query.

At operation 1160, the search system 216 retrieves the stored profile vector representations of the plurality of user profiles from the database of the social networking service based on the receiving of the query. In some example embodiments, the plurality of user profiles are selected in response to the receiving of the query based on a comparison of the query data and the corresponding profile data of the user profiles, and the retrieving of the stored profile vector representations of the plurality of user profiles from the database of the social networking service is further based on the selecting of the plurality of user profiles.

At operation 1170, the search system 216, for each one of the plurality of user profiles, generates, using a third neural network distinct from the first neural network and the second neural network, a corresponding score for a pairing of the one of the plurality of user profiles and the query based on a determined level of similarity between the profile vector representation of the one of the plurality of user profiles and the query vector representation. In some example embodiments, the third neural network determines the level of similarity between the profile vector representation of the one of the plurality of user profiles and the query vector representation based on a cosine similarity calculation. In some example embodiments, the third neural network determines the level of similarity between the profile vector representation of the one of the plurality of user profiles and the query vector representation based on a dot product calculation.

At operation 1180, the search system 216 causes an indication of at least a portion of the plurality of user profiles to be displayed on the computing device as search results for the query based on the generated scores of the plurality of user profiles. In some example embodiments, the causing the indication of at least a portion of the plurality of user profiles to be displayed on the computing device as search results for the query comprises ranking the plurality of user profiles based on their corresponding scores, and causing the at least a portion of the plurality of user profiles to be displayed on the computing device as search results for the query based on the ranking of the plurality of user profiles.

In some example embodiments, the first neural network, the second neural network, and the third neural network are implemented on separate physical computer systems, with each one of the separate physical computer systems having its own set of one or more hardware processors separate from the other separate physical computer systems. In some example embodiments, the first neural network, the second neural network, and the third neural network each comprise a deep neural network. In some example embodiments, the first neural network comprises a convolutional neural network.

It is contemplated that any of the other features described within the present disclosure can be incorporated into the method 1100.

In some example embodiments, the search system 216 provides a flexible ranking model that allows for easy adaptation to novel features and training schemes. In some example embodiments, the search system 216 utilizes a multilayer perceptron (MLP) with custom unit activations for the ranking tasks, and employs a model that supports a mix of model regularization methods including L2 norm penalty and dropout. The search system 216 may employ two different learning to rank approaches for the training objective of the neural network, pointwise learning and pairwise learning.

In some example embodiments, the search system 216 uses pointwise learning, also referred to as ranking by binary classification. This method involves training a binary classifier utilizing each example in the training set with their labels, and then grouping the examples from the same search session together and ranking them based on their scores. For this purpose, the search system 216 may apply logistic regression on top of the neural network by including a classification layer that sums the output activations from the neural network, passes the sum through the logistic function, and then trains against the labels using the binomial log-likelihood loss. One example of the logistic function is as follows:

$$\sigma_i = \frac{1}{1 + \exp(-\langle w, \psi(x_i) \rangle)}, i \in \{1, \cdots, n\}$$

$$\mathcal{L} = -\sum_{i=1}^{n} y_i \log(\sigma_i) + (1 - y_i) \log(1 - \sigma_i)$$

In the above equations, $\psi(\bullet)$ refers to the neural network function, and $\sigma_i$ is the value of the logistic function applied to the score for the $i^{th}$ training example.

In some example embodiments, the search system 216 uses pairwise learning. Although pointwise learning has its advantages, the main goal for candidate search ranking is to provide a ranking of candidates that is guided by the information inherent in available session-based data. Since it is desirable to compare candidates within the same session depending on how they differ with respect to the mutual interest between the recruiter and the candidate (e.g., inMail accept), in some example embodiments, the search system 216 forms pairs of examples with positive and negative labels respectively from the same session and trains the neural network to maximize the difference of scores between the paired positive and negative examples:

$$d_{i^+,i^-} = \langle w, \psi(x_{i^+}) - \psi(x_{i^-}) \rangle,$$

$$\mathcal{L} = \sum_{\substack{(i^+,i^-):s_{i^+}=s_{i^-}, \\ y_{i^+}=1, y_{i^-}=0}} f(d_{i^+}, d_{i^-}).$$

The score difference between a positive and a negative example is denoted by $d_{i^+,i^-}$, with $i^+$ and $i^-$ indicating the indices for a positive and a negative example, respectively.

Figure 12:
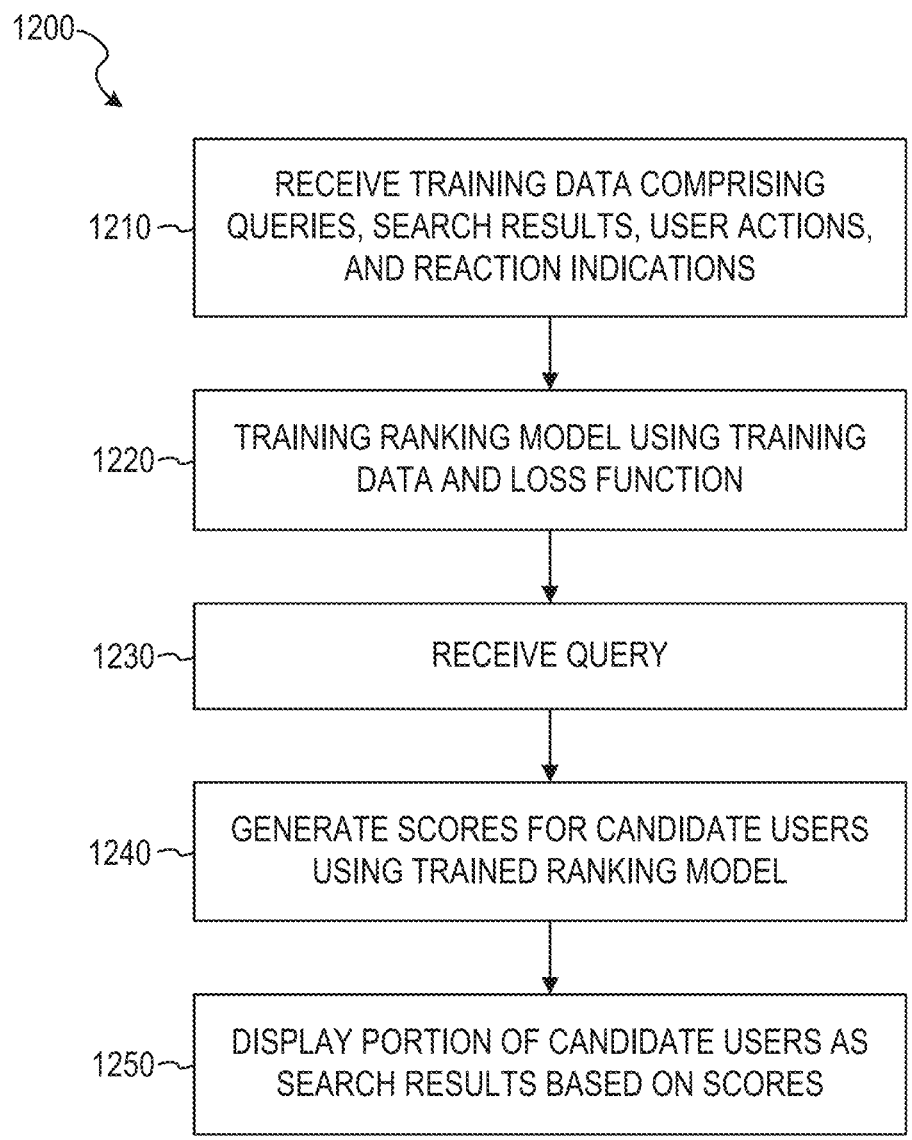
FIG. 12 is a flowchart illustrating a method of applying learning to rank with deep models for search, in accordance with an example embodiment.

FIG. 12 is a flowchart illustrating a method 1200 of applying learning to rank with deep models for search, in accordance with an example embodiment. The method 1200 can be performed by processing logic that can comprise hardware (e.g., circuitry, dedicated logic, programmable logic, microcode, etc.), software (e.g., instructions run on a processing device), or a combination thereof. In one implementation, the method 1200 is performed by the search system 216 of FIG. 2.

At operation 1210, the search system 216 receives training data comprising a plurality of reference queries, a plurality of reference search results for each one of the plurality of reference queries, a plurality of user actions for each one of the plurality of reference queries, and a corresponding reaction indication for each one of the plurality of user actions. In some example embodiments, each one of the plurality of reference queries comprises reference query data and having been submitted by a reference querying user, the corresponding plurality of reference search results for each one of the plurality of reference queries comprise a plurality of reference candidate users displayed in response to the plurality of reference search queries based on profile data of the plurality of reference candidate users stored on a database of a social networking service, the plurality of user actions comprise actions by the reference querying user directed towards at least one reference candidate user of the plurality of reference search results for the corresponding reference search query, and each reaction indication indicates whether the reference candidate user to whom the corresponding user action was directed responded to the corresponding user action with at least one of one or more specified responses.

At operation 1220, the search system 216 trains a ranking model using the training data and a loss function. In some example embodiments, the ranking model comprises a deep learning model and configured to generate similarity scores based on a determined level of similarity between the profile data of the reference candidates users and the reference query data of the reference queries. In some example embodiments, the training of the ranking model comprises using a pointwise learning model in applying the loss function. In some example embodiments, the loss function comprises a binomial log-likelihood loss function. In some example embodiments, the training of the ranking model comprises using a pairwise learning model in applying the loss function. In some example embodiments, the loss function comprises a logistic loss function. In some example embodiments, the loss function comprises a hinge loss function. In some example embodiments, the deep learning model comprises a neural network. In some example embodiments, the neural network comprises a multilayer perceptron.

At operation 1230, the search system 216 receives a target query comprising target query data from a computing device of a target querying user.

At operation 1240, the search system 216, for each one of a plurality of target candidate users, generates a corresponding score for a pairing of the one of the plurality of target candidate users and the target query based on a determined level of similarity between profile data of the one of the plurality of target candidate users and the target query data of the target query using the trained ranking model.

At operation 1250, the search system 216 causes an indication of at least a portion of the plurality of target candidate users to be displayed on the computing device as search results for the target query based on the generated scores of the plurality of target candidate users.

It is contemplated that any of the other features described within the present disclosure can be incorporated into the method 1200.

Example Mobile Device

Figure 13:
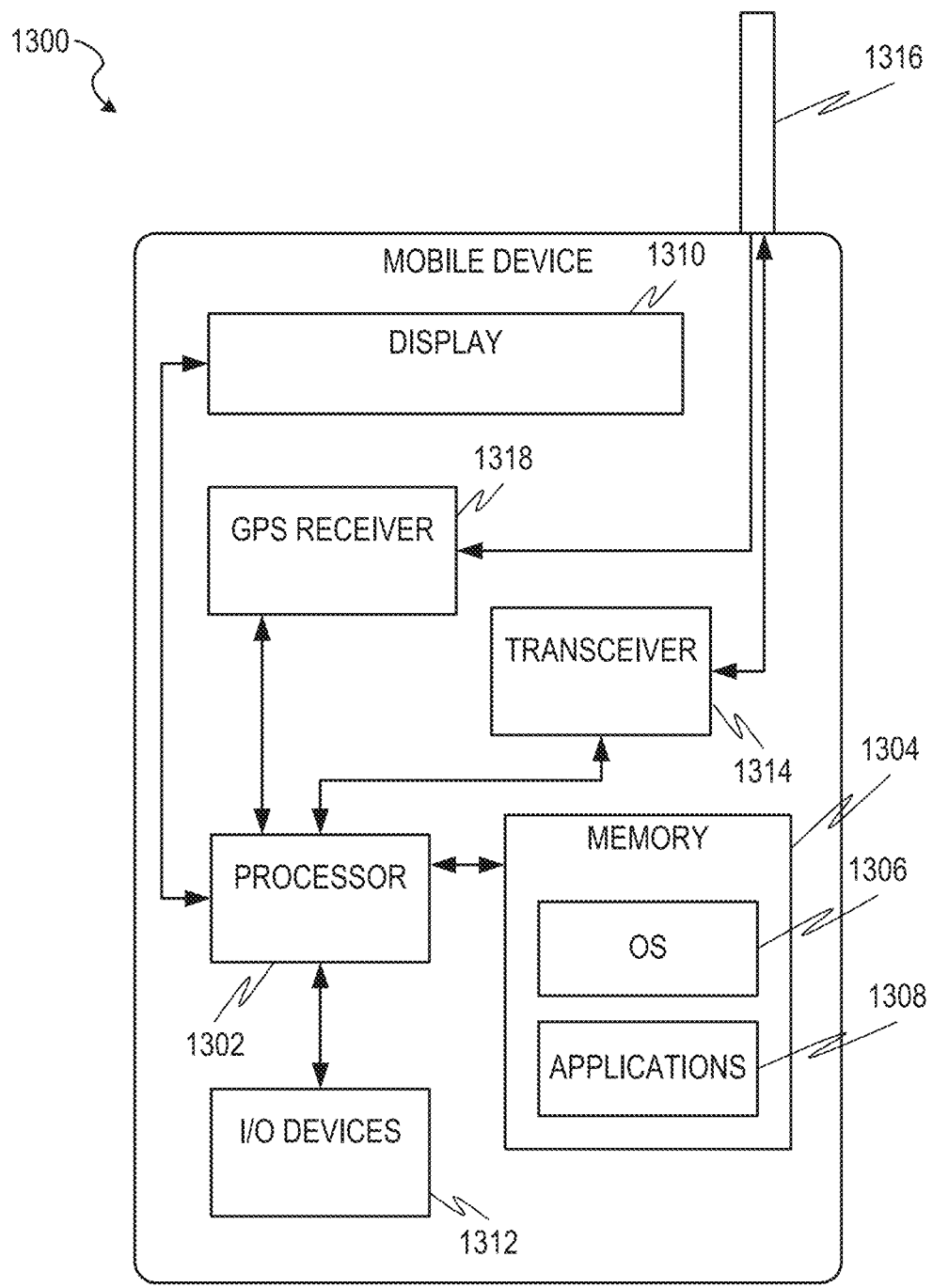
FIG. 13 is a block diagram illustrating a mobile device, in accordance with some example embodiments.

FIG. 13 is a block diagram illustrating a mobile device 1300, according to an example embodiment. The mobile device 1300 can include a processor 1302. The processor 1302 can be any of a variety of different types of commercially available processors suitable for mobile devices 1300 (for example, an XScale architecture microprocessor, a Microprocessor without Interlocked Pipeline Stages (MIPS) architecture processor, or another type of processor). A memory 1304, such as a random access memory (RAM), a Flash memory, or other type of memory, is typically accessible to the processor 1302. The memory 1304 can be adapted to store an operating system (OS) 1306, as well as application programs 1308, such as a mobile location-enabled application that can provide location-based services (LBSs) to a user. The processor 1302 can be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 can be coupled to a transceiver 1314 that interfaces with an antenna 1316. The transceiver 1314 can be configured to both transmit and receive cellular network signals, wireless data signals, or other types of signals via the antenna 1316, depending on the nature of the mobile device 1300. Further, in some configurations, a GPS receiver 1318 can also make use of the antenna 1316 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily, configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
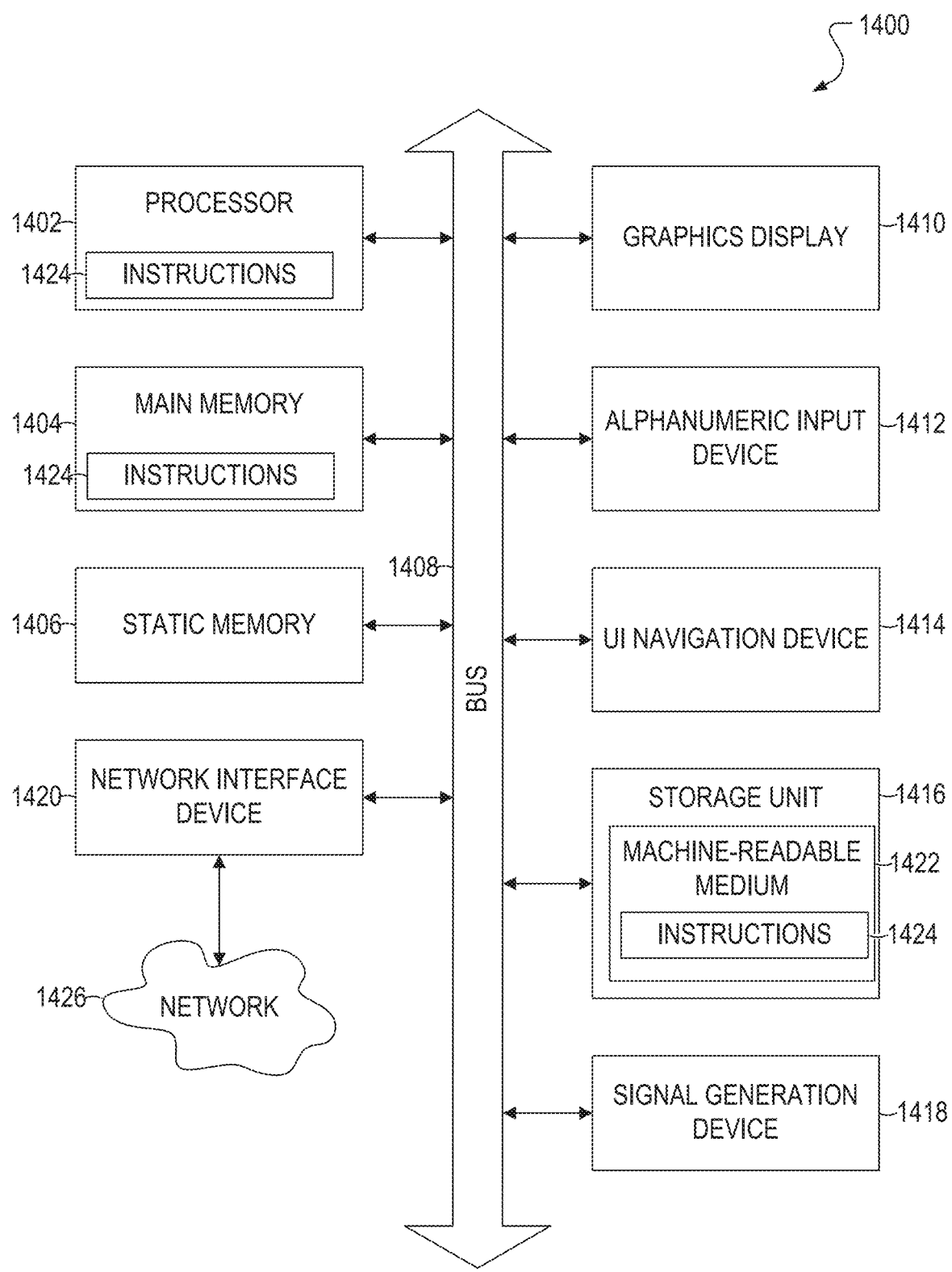
FIG. 14 is a block diagram of an example computer system on which methodologies described herein may be executed, in accordance with an example embodiment.

FIG. 14 is a block diagram of an example computer system 1400 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a graphics display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation device 1414 (e.g., a mouse), a storage unit 1416, a signal generation device 1418 (e.g., a speaker) and a network interface device 1420.

Machine-Readable Medium

The storage unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions (e.g., instructions 1424) for execution by the machine and that cause the machine to perform any one or more of the methodologies of the present disclosure; or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices; e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet; mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   for each one of a plurality of users of an online service, accessing, by a computer system having a memory and at least one hardware processor, corresponding profile data of the user stored on a database of the online service, the accessed profile data of each user indicating at least one entity associated with the user;
   generating, by the computer system, a first graph data structure based on the accessed profile data, the generated first graph data structure comprising a first plurality of nodes and a first plurality of edges, each one of the first plurality of nodes corresponding to a different entity indicated by the accessed profile data, and each one of the first plurality of edges directly connecting a different pair of the first plurality of nodes and indicating a number of the plurality of users whose profile data includes both entities of the pair of nodes that are directly connected by the edge, a first entity of the both entities of the pair of nodes that are directly connected by the edge comprising one of a first job title, a first company, a first skill, a first school, a first educational degree, or a first educational major, and a second entity of the both entities of the pair of nodes that are directly connected by the edge comprising one of a second job title, a second company, second skill, a second school, a second educational degree, or a second educational major;
   generating, by the computer system, a corresponding embedding vector for each one of the entities indicated by the accessed profile data based on the first graph data structure using an unsupervised machine learning algorithm, the unsupervised machine learning algorithm is configured to optimize the corresponding embedding vector of each one of the entities to result in a level of similarity between the corresponding embedding vectors of two entities increasing as the number of the plurality of users whose profile data indicates the two entities increases, and the unsupervised machine learning algorithm is further configured to optimize the corresponding embedding vector of each one of the entities to result in the level of similarity between the corresponding embedding vectors of two entities increasing as the number of neighbor nodes shared by the two entities increases; and
   performing, by the computer system, a function of the online service using the generated embedding vectors of the entities.

2. The computer-implemented method of claim 1, wherein the performing the function comprises:
   receiving, from a client computing device, a search query indicating an entity;
   generating one or more search results for the search query using the generated embedding vectors of the entities, the one or more search results comprising at least one of the plurality of users; and
   causing the one or more search results to be displayed on the client computing device.

3. The computer-implemented method of claim 1, wherein the corresponding entity for each node in the first plurality of nodes of the first graph data structure is of a first facet type.

4. The computer-implemented method of claim 1, wherein the embedding vectors for the plurality of entities are generated using a neural network.

5. The computer-implemented method of claim 1, wherein the corresponding entity for each node in the first plurality of nodes of the first graph data structure is of a first facet type, the method further comprising:
   generating, by the computer system, a second graph data structure comprising a second plurality of nodes and a second plurality of edges, each one of the second plurality of nodes corresponding to a different entity of a second facet type indicated by the accessed profile data, the second facet type being different from the first facet type and each one of the second plurality of edges directly connecting a different pair of the second plurality of nodes and indicating a number of the plurality of users whose profile data indicates both entities of the pair of nodes that are directly connected by the edge in the second graph data structure; and
   generating, by the computer system, a corresponding embedding vector for each one of the entities of the second facet type based on the second graph data structure using the unsupervised machine learning algorithm,
   wherein the function of the online service is performed using the generated embedding vectors of the entities, of the second facet type.

6. A system comprising:
   at least one hardware processor; and
   a non-transitory machine-readable medium embodying a set of instructions that, when executed by at least one hardware processor, cause the processor to perform operations comprising:
      for each one of a plurality of users of an online service, accessing corresponding profile data of the user stored on a database of the online service, the accessed profile data of each user indicating at least one entity associated with the user;
      generating a first graph data structure based on the accessed profile data, the generated first graph data structure comprising a first plurality of nodes and a first plurality of edges, each one of the first plurality of nodes corresponding to a different entity indicated by the accessed profile data, and each one of the first plurality of edges directly connecting a different pair of the first plurality of nodes and indicating a number of the plurality of users whose profile data includes both entities of the pair of nodes that are directly connected by the edge, a first entity of the both entities of the pair of nodes that are directly connected by the edge comprising one of a first job title, a first company, a first skill, a first school, a first educational degree, or a first educational major, and a second entity of the both entities of the pair of nodes that are directly connected by the edge comprising one of a second job title, a second company, a second skill, a second school, a second educational degree, or a second educational major, the corresponding entity for each node in the first plurality of nodes of the first graph data structure is of a first facet type;

generating a corresponding embedding vector for each one of the entities indicated by the accessed profile data based on the first graph data structure using an unsupervised machine learning algorithm;

generating a second graph data structure comprising a second plurality of nodes and a second plurality of edges, each one of the second plurality of nodes corresponding to a different entity of a second facet type indicated by the accessed profile data, and each one of the second plurality of edges directly connecting a different pair of the second plurality of nodes and indicating a number of the plurality of users whose profile data indicates both entities of the pair of nodes that are directly connected by the edge in the second graph data structure; and generating a corresponding embedding vector for each one of the entities of the second facet type based on the second graph data structure using the unsupervised machine learning algorithm; and performing a function of the online service using the generated embedding vectors of the entities, the function of the online service is performed using the generated embedding vectors of the entities of the second facet type.

7. The system of claim 6, wherein the performing the function comprises:
receiving, from a client computing device, a search query indicating an entity;
generating one or more search results for the search query using the generated embedding vectors of the entities, the one or more search results comprising at least one of the plurality of users; and
causing the one or more search results to be displayed on the client computing device.

8. The system of claim 6, wherein the corresponding entity for each node in the first plurality of nodes of the first graph data structure is of a first facet type.

9. The system of claim 6, wherein the unsupervised machine learning algorithm is configured to optimize the corresponding embedding vector of each one of the entities to result in a level of similarity between the corresponding embedding vectors of two entities increasing as the number of the plurality of users whose profile data indicates the two entities increases.

10. The system of claim 9, wherein the unsupervised machine learning algorithm is further configured to optimize the corresponding embedding vector of each one of the entities to result in a level of similarity between the corresponding embedding vectors of two entities increasing as the number of neighbor nodes shared by the two entities increases.

11. The system of claim 6, wherein the embedding vectors for the plurality of entities are generated using a neural network.

12. A non-transitory machine-readable medium embodying a set of instructions that, when executed by at least one hardware processor, cause the processor to perform operations comprising:
for each one of a plurality of users of an online service, accessing corresponding profile data of the user stored on a database of the online service, the accessed profile data of each user indicating at least one entity associated with the user;
generating a first graph data structure based on the accessed profile data, the generated first graph data structure comprising a first plurality of nodes and a first plurality of edges, each one of the first plurality of nodes corresponding to a different entity indicated by the accessed profile data, and each one of the first plurality of edges directly connecting a different pair of the first plurality of nodes and indicating a number of the plurality of users whose profile data includes both entities of the pair of nodes that are directly connected by the edge, a first entity of the both entities of the pair of nodes that are directly connected by the edge comprising one of a first job title, a first company, a first skill, a first school, a first educational degree, or a first educational major, and a second entity of the both entities of the pair of nodes that are directly connected by the edge comprising one of a second job title, a second company, a second skill, a second school, a second educational degree, or a second educational major;
generating a corresponding embedding vector for each one of the entities indicated by the accessed profile data based on the first graph data structure using an unsupervised machine learning algorithm, the unsupervised machine learning algorithm is configured to optimize the corresponding embedding vector of each one of the entities to result in a level of similarity between the corresponding embedding vectors of two entities increasing as the number of the plurality of users whose profile data indicates the two entities increases, and the unsupervised machine learning algorithm is further configured to optimize the corresponding embedding vector of each one of the entities to result in the level of similarity between the corresponding embedding vectors of two entities increasing as the number of neighbor nodes shared by the two entities increases; and
performing a function of the online service using the generated embedding vectors of the entities.

13. The non-transitory machine-readable medium of claim 12, wherein the performing the function comprises:
receiving, from a client computing device, a search query indicating an entity;
generating one or more search results for the search query using the generated embedding vectors of the entities, the one or more search results comprising at least one of the plurality of users; and
causing the one or more search results to be displayed on the client computing device.

14. The non-transitory machine-readable medium of claim 12, wherein corresponding entity for each node in the first plurality of nodes of the first graph data structure is of a first facet type.

15. The non-transitory machine-readable medium of claim 12, wherein corresponding entity for each node in the first plurality of nodes of the first graph data structure is of a first facet type the first facet type comprising a category of job titles, a category of companies, a category of skills, a category of schools, a category of educational degrees, or a category of educational majors.

16. The non-transitory machine-readable medium of claim 15, wherein the operations further comprise:
generating a second graph data structure comprising a second plurality of nodes and a second plurality of edges, each one of the second plurality of nodes corresponding to a different entity of a second facet type indicated by the accessed profile data the second facet type being different from the first facet type and comprising the category of job titles, the category of companies, the category of skills, the category of schools, the category of educational degrees, or the category of educational majors, and each one of the second plurality of edges directly connecting a different pair of the second plurality of nodes and indicating a number of the plurality of users whose profile data indicates both entities of the pair of nodes that are directly connected by the edge in the second graph data structure; and generating a corresponding embedding vector for each one of the entities of the second facet type based on the second graph data structure using the unsupervised machine learning algorithm, wherein the function of the online service is performed using the generated embedding vectors of the entities of the second facet type.

* * * * *

UNITED STATES PATENT AND TRADEMARK OFFICE
CERTIFICATE OF CORRECTION

PATENT NO. : 11,106,979 B2  
APPLICATION NO. : 16/021617  
DATED : August 31, 2021  
INVENTOR(S) : Ramanath et al.

Page 1 of 1

It is certified that error appears in the above-identified patent and that said Letters Patent is hereby corrected as shown below:

In the Claims

In Column 36, Line 20, in Claim 5, delete "type" and insert --type,-- therefor

In Column 36, Line 32, in Claim 5, delete "entities," and insert --entities-- therefor In Column 38, Line 47, in Claim 14, after "wherein", insert --the--

In Column 38, Line 51, in Claim 15, after "wherein", insert --the--

In Column 38, Line 53, in Claim 15, delete "type" and insert --type,-- therefor

In Column 38, Line 63, in Claim 16, delete "data" and insert --data,-- therefor

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*